United States Patent
Li et al.

(10) Patent No.: US 12,389,064 B2
(45) Date of Patent: Aug. 12, 2025

(54) VIDEO OBTAINING METHOD AND APPARATUS, VIDEO SHARING METHOD AND APPARATUS, DEVICE, AND MEDIUM

(71) Applicant: Beijing Bytedance Network Technology Co., Ltd., Beijing (CN)

(72) Inventors: Xinyi Li, Beijing (CN); Jing Chen, Beijing (CN); Jingran Zhou, Beijing (CN); Min Zhu, Beijing (CN); Siqi Tan, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/447,643

(22) Filed: Aug. 10, 2023

(65) Prior Publication Data

US 2023/0412871 A1    Dec. 21, 2023

Related U.S. Application Data

(63) Continuation-in-part of application No. PCT/CN2022/075360, filed on Feb. 7, 2022.

(30) Foreign Application Priority Data

Feb. 10, 2021  (CN) .................. 202110185449.X

(51) Int. Cl.
*H04N 21/431* (2011.01)
*H04N 5/262* (2006.01)
(Continued)

(52) U.S. Cl.
CPC ....... *H04N 21/4318* (2013.01); *H04N 5/2621* (2013.01); *H04N 5/76* (2013.01); *H04N 21/4312* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 2011/0066940 | A1 | 3/2011 | Asghari Kamrani et al. |
| 2011/0231260 | A1* | 9/2011 | Price ................. G06Q 30/0264 |
| | | | 707/E17.014 |

(Continued)

FOREIGN PATENT DOCUMENTS

| | | |
|---|---|---|
| CN | 101945278 A | 1/2011 |
| CN | 105898549 A | 8/2016 |

(Continued)

OTHER PUBLICATIONS

International Search Report and Written Opinion issued Mar. 17, 2022 for International Application No. PCT/CN2022/075360, English translation.

(Continued)

*Primary Examiner* — Kyle Zhai

(57) ABSTRACT

The present invention relates to a video obtaining method and apparatus, a video sharing method and apparatus, a device, and a medium. The video obtaining method includes: a first client receiving a selection instruction of a first user for a video customization anchor displayed on a first page, and displaying a video customization related page, the video customization related page comprising: a video customization information filling-in page; receiving video customization information input by the first user in the video customization information filling-in page; receiving a video customization information submission instruction input by the first user, and sending a video customization request message to a second client; receiving a video customization response message sent by the second client; and displaying a customized video corresponding to the video (Continued)

customization information, the first page displaying a non-customized video of a second user.

10 Claims, 22 Drawing Sheets

(51) Int. Cl.
*H04N 5/76* (2006.01)
*H04N 21/4788* (2011.01)

(56) References Cited

U.S. PATENT DOCUMENTS

| | | | |
|---|---|---|---|
| 2012/0219272 A1 | 8/2012 | Eto et al. | |
| 2017/0013145 A1* | 1/2017 | Hong | G06F 9/44505 |
| 2017/0069013 A1* | 3/2017 | Castillo | G06Q 50/01 |
| 2017/0287024 A1* | 10/2017 | Bakun | G06Q 30/0601 |
| 2019/0200064 A1 | 6/2019 | Louis et al. | |
| 2020/0213326 A1* | 7/2020 | Herman | H04L 51/10 |

FOREIGN PATENT DOCUMENTS

| | | |
|---|---|---|
| CN | 106780665 A | 5/2017 |
| CN | 106851418 A | 6/2017 |
| CN | 108460104 A | 8/2018 |
| CN | 110381381 A | 10/2019 |
| CN | 110868637 A | 3/2020 |
| CN | 112241397 A | 1/2021 |
| JP | 2009-527135 A | 7/2009 |
| JP | 2011-103574 A | 5/2011 |
| WO | 2007/082167 A2 | 7/2007 |
| WO | 2014100893 A1 | 7/2014 |

OTHER PUBLICATIONS

First Office Action issued Jan. 19, 2024 in CN Appl. No. 202111058065.8, English translation (17 pages).
European Search Report for EP Patent Application No. 22752213.3, Issued on May 21, 2024, 64 pages.
Office action received from Japanese patent application No. 2023-547768 mailed on Sep. 17, 2024, 10 pages (5 pages English Translation and 5 pages Original Copy).

* cited by examiner

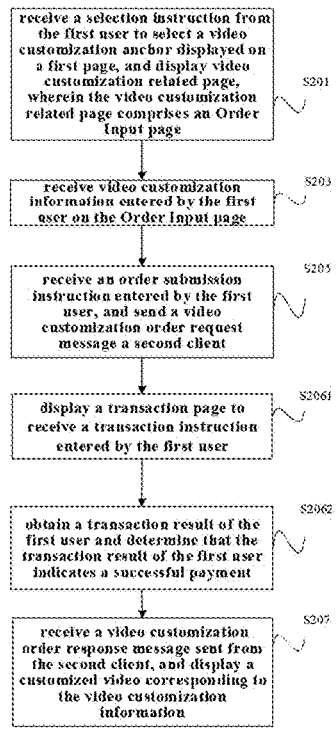
FIG. 13
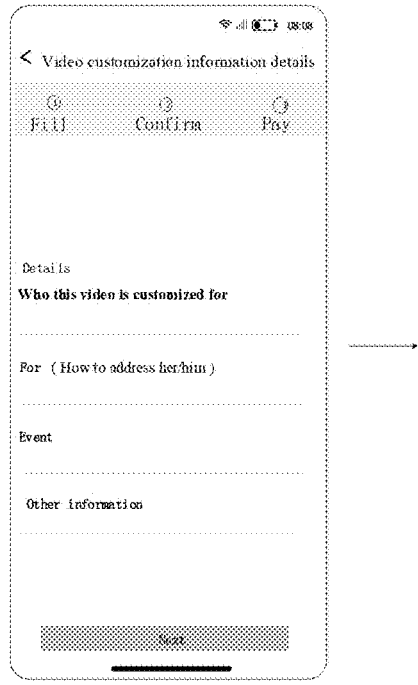
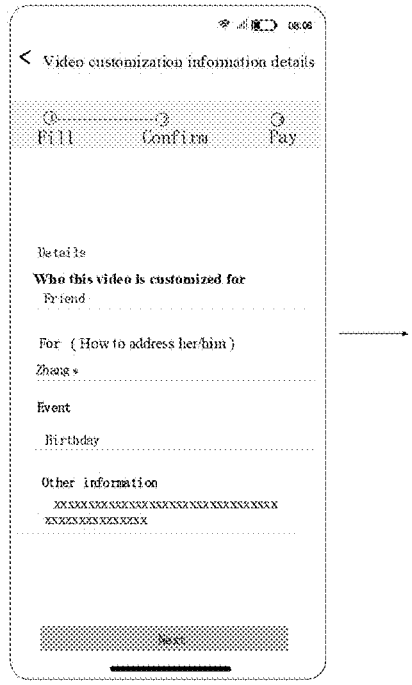
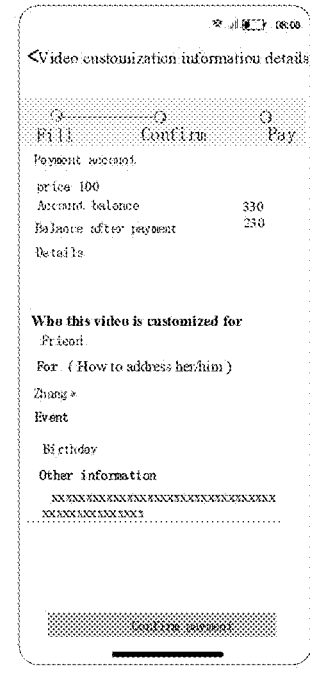
FIG. 14A  FIG. 14B  FIG. 14C

  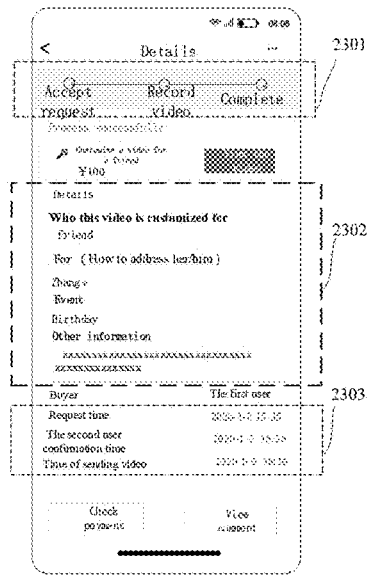
FIG. 23A  FIG. 23B  FIG. 23C
 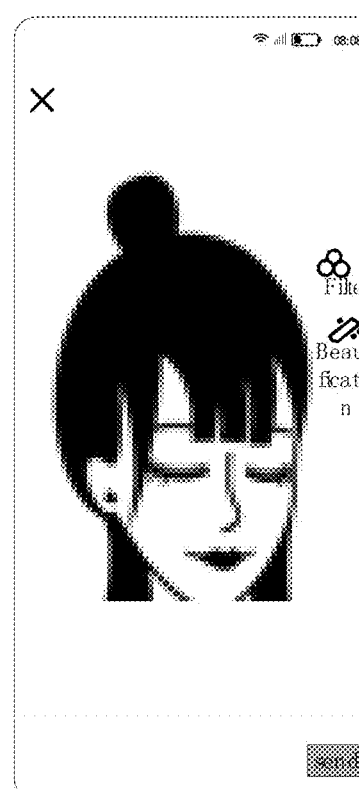
FIG. 24A  FIG. 24B

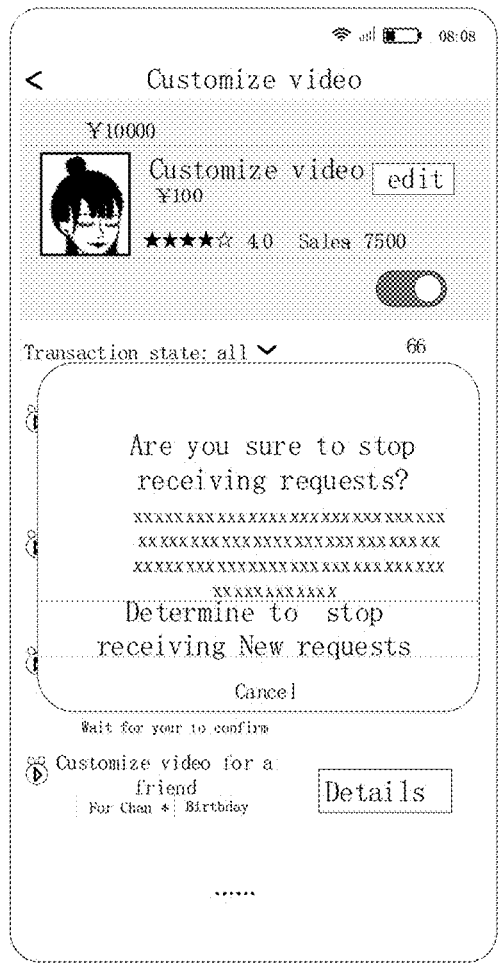 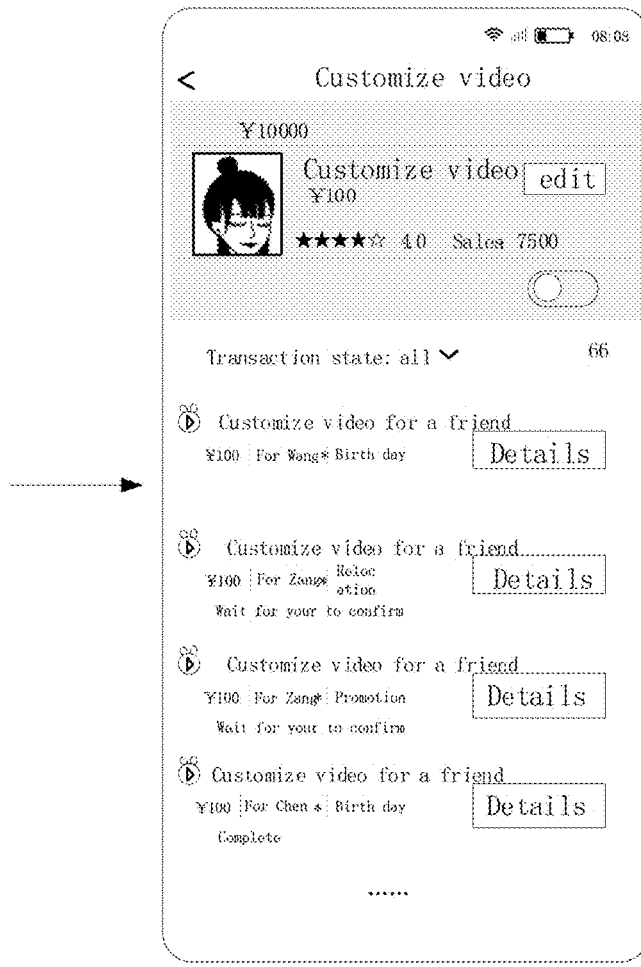
FIG. 28A   FIG. 28B
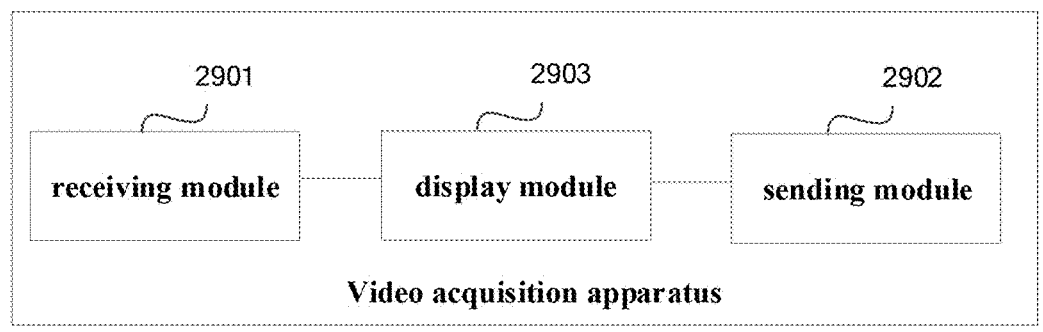
FIG. 29

VIDEO OBTAINING METHOD AND APPARATUS, VIDEO SHARING METHOD AND APPARATUS, DEVICE, AND MEDIUM

CROSS-REFERENCE TO RELATED APPLICATIONS

The present disclosure is a U.S. National Stage Application under 35 U.S.C. § 371 of International Patent Application No. PCT/CN2022/075360, filed on Feb. 7, 2022, which is based on and claims priority of Chinese application for invention 202110185449.X, filed on Feb. 10, 2021, the disclosure of which is hereby incorporated into this disclosure by reference in its entirety.

TECHNICAL FIELD

This disclosure relates to the field of the internet technology, in particular to a video acquisition method, a video sharing method, an apparatus, a device, and a medium.

BACKGROUND

With the rapid development of internet technology, internet-based social software has been widely used.

In related technologies, video providers can record videos (such as short videos) through applications and publish the videos, so that video viewers can watch the videos published by the video providers. Video viewers can also comment on the videos to increase interactions between the video providers and the video viewers. Thus, the convenience of interactions between users is improved.

SUMMARY

A first aspect of this disclosure provides a video acquisition method applied to a first client, wherein the first client is used by a first user to acquire non-customized video and customized video shared by a second user, the method comprising: receiving a selection instruction from a first user to select a video customization anchor displayed on a first page, and displaying video customization related page, wherein the first page displays non-customized video shared by the second user, and the video customization related page comprise a filling page of video customization information; receiving video customization information entered by the first user on the filling page of video customization information; receiving a submission instruction of the video customization information entered by the first user, and sending a video customization request message to a second client, wherein the video customization request message comprises the video customization information; receiving a video customization response message sent from the second client, and displaying a customized video corresponding to the video customization information, wherein the video customization response message comprises the customized video.

Optionally, receiving a selection instruction from a first user to select a video customization anchor displayed on a first page comprises: receiving a selection instruction from the first user to select a video customization anchor displayed in a Personal detail page of the second user; or receiving a selection instruction from the first user to select a video customization anchor displayed on a video playing page of non-customized video of the second user.

Optionally, receiving a selection instruction from the first user to select a video customization anchor displayed on a video playing page of non-customized video of the second user comprises: receiving a selection instruction from the first user to select a single anchor displayed on the video playing page of the non-customized video of the second user, wherein the single anchor is the video customization anchor; or receiving a selection instruction from the first user to select a combined anchor displayed on the video playing page of the non-customized video of the second user, displaying an Anchor presentation page corresponding to the combined anchor, and receiving a selection instruction from the first user to select a video customization anchor on the Anchor presentation page, wherein the Anchor presentation page comprises the video customization anchor.

Optionally, the video customization anchor comprises a link or a button.

Optionally, the video customization related page further comprise: a first introduction page comprising an Introduction Video page for displaying an introduction video and a Description page for displaying a video customization information filling button; before receiving video customization information input by the first user on the filling page of video customization information, the method further comprises at least one of: receiving a selection instruction from the first user to select the video customization information filling button, and displaying the filling page of video customization information; or receiving a selection instruction from the first user to select the Introduction Video page, and playing the introduction video.

Optionally, before receiving a video customization response message sent from the second client, the method further comprises:
  displaying a transaction page to receive a transaction instruction entered by the first user; acquiring a transaction result of the first user, and determining that the transaction result of the first user indicates a successful payment.

Optionally, after displaying a customized video corresponding to the video customization information, the method further comprises at least one of: receiving a playing instruction entered by the first user to play the customized video, and playing the customized video; or receiving a download instruction entered by the first user to download the customized video, and downloading the customized video; or receiving a forward instruction entered by the first user to forward the customized video, and forwarding the customized video.

Optionally, after sending a video customization request message to the second client, the method further comprises: receiving a Transaction detail inquiry instruction entered by the first user, and displaying a Detail page, which comprises transaction progress information comprising at least one of a transaction progress bar or a transaction progress time list.

Optionally, receiving a Transaction detail inquiry instruction entered by the first user comprises: receiving a selection instruction from the first user to select a message item of the second user, and displaying a prompt message comprising a Detail guide item; receiving a selection instruction from the first user to select the Detail guide item.

Optionally, after displaying a customized video corresponding to the video customization information, the method further comprises: displaying a Comment page comprising a Comment item and a Post Comment button; receiving information entered by the first user for the comment item; receiving a selection instruction from the first user to select the Post Comment button, and displaying a Comment Result page for displaying comment state.

Optionally, the customized video is recorded by the second user on a second client, the second client and the first client being clients of the same application.

A second aspect of this disclosure provides a video sharing method applied to a second client, wherein the second client is used by a second user to share non-customized video and customized video, the method comprising: receiving a video customization request message sent by a first client, wherein the video customization request message comprises video customization information, and generating a detail page based on the video customization request message; receiving a Detail checking instruction entered by the second user, and displaying the Detail page that displays the video customization information; receiving a Video recording instruction entered by the second user on the Detail page, and displaying a Video recording window; generating a customized video based on a record operation input by the second user in the Video recording window; sending a video customization response message to the first client, which comprises the customized video.

Optionally, receiving a Detail checking instruction entered by the second user comprises: receiving a selection instruction from the second user to select a Detail guide button displayed on a Request List page; or receiving a selection instruction from the second user to select a Detail guide button displayed on a prompt message within a dialog box with the first user.

Optionally, before receiving a selection instruction from the second user to select a Detail guide button displayed on a Request List page, the method further comprises: receiving a selection instruction from the second user to select a video customization anchor displayed in a Personal detail page of the second user, and displaying the Request List page; or receiving a selection instruction from the second user to select a video customization anchor displayed on a User Account page, and displaying the Request List page; or receiving a selection instruction from the second user to select a video customization anchor displayed on a Video playing page of non-customized video of the second user, and displaying the Request List page.

Optionally, the Request List page further comprises: a Selection switch. wherein, the method further comprises: receiving a selection instruction from the second user to select the Selection switch, and sending a state update message of a filling page of the video customization information to the first client to update a state of the filling page of video customization information of the first client to valid or invalid.

Optionally, the Request List page further comprises: an introduction area in which an Edit button is displayed; wherein, the method further comprises: receiving a selection instruction from the second user to select the Edit button, displaying an Introduction Reset page, which comprises at least one of a Description edition area, a Transaction setting item, an introduction preview guide item, and a Video recording button.

Optionally, the method further comprises: receiving a recall instruction entered by the second user on the Introduction Reset page, which is used to overlay the display of an Exit Video Customization button on the Introduction Reset page; receiving a selection instruction from the second user to select the Exit Video Customization button, and sending a state update message of a filling page of the video customization information to the first client to update a state of the filling page of video customization information of the first client to invalid.

Optionally, before receiving a Detail checking instruction entered by the second user, the method further comprises: receiving a selection instruction from the second user to select a video customization anchor in a user account page for a first time, and displaying a Video Customization Function page, which comprises a Create Introduction Page button; receiving a selection instruction from the second user to select the Create Introduction Page button, and displaying a Video recording window; generating an introduction video based on a video recording operation of the second user; displaying an Introduction Setting page, which comprises at least one of a Description edition area, a Transaction setting item, and an introduction preview guide item; receiving an input instruction from the second user to select at least one of the Description edition area, the Transaction setting item, and the Introduction preview guide item; receiving a selection instruction from the second user to select a Publish button displayed on the Introduction Setting page, and displaying a publishing result.

A third aspect of this disclosure provides a video acquisition apparatus applied to a first client, wherein the first client is used by a first user to acquire non-customized video and customized video shared by a second user, the apparatus comprising: a receiving module, a sending module, and a display module; the receiving module is used for receiving a selection instruction from a first user to select a video customization anchor displayed on a first page, and the display module is used for displaying video customization related page, wherein the first page displays non-customized video shared by the second user, and the video customization related page comprise a filling page of video customization information; the receiving module is further used for receiving video customization information input by the first user on the filling page of video customization information; the receiving module is further used for receiving a submission instruction of the video customization information entered by the first user, the sending module is used for sending a video customization request message to a second client, wherein the video customization request message comprises the video customization information; the receiving module is further used for receiving a video customization response message sent from the second client, and the display module is further used for displaying a customized video corresponding to the video customization information, wherein the video customization response message comprises the customized video.

A fourth aspect of this disclosure provides a video sharing apparatus applied to a second client, wherein the second client is used by a second user to share non-customized video and customized video, the apparatus comprising: a receiving module, a sending module, a processing module, and a display module; the receiving module is used for receiving a video customization request message sent by a first client, wherein the video customization request message comprises video customization information; and generating a detail page based on the video customization request message; the receiving module is further used for receiving a Detail checking instruction entered by the second user, and the display module is used for displaying the Detail page that displays the video customization information; the receiving module is further used for receiving a Video recording instruction entered by the second user on the Detail page, and the display module is further used for displaying a Video recording window; the processing module is used for generating a customized video based on a record operation input by the second user in the Video recording window;

the sending module is used for sending a video customization response message to the first client, which comprises the customized video.

A fifth aspect of the present disclosure provides an electronic device, comprising: a processor for executing a computer program stored in memory, wherein the computer program, when executed by the processor, implements the steps of the method described above in the first aspect.

A sixth aspect of the present disclosure provides a non-transitory computer-readable medium having stored thereon a computer program that, when executed by a processor, implements the steps of the method described above in the first aspect.

A seventh aspect of the present disclosure provides a computer program product that, when running on a computer, causes the computer to implement the steps of the method described above in the first aspect.

An eighth aspect of the present disclosure provides an electronic device, comprising: a processor for executing a computer program stored in memory, wherein the computer program, when executed by the processor, implements the steps of the method described above in the second aspect.

A ninth aspect of the present disclosure provides a non-transitory computer-readable medium having stored thereon a computer program that, when executed by a processor, implements the steps of the method described above in the second aspect.

A tenth aspect of the present disclosure provides a computer program product that, when running on a computer, causes the computer to implement the steps of the method described above in the second aspect.

An eleventh aspect of the present disclosure provides a computer program, comprising: instructions that, when executed by a processor, cause the processor to execute the video acquisition method of any one of the above embodiments.

A twelfth aspect of the present disclosure provides a computer program, comprising: instructions that, when executed by a processor, cause the processor to execute the video sharing method of any one of the above embodiments.

A thirteenth aspect of the present disclosure provides a computer program product comprising instructions that, when executed by a processor, cause the processor to execute the video acquisition method of any one of the above embodiments.

A fourteenth aspect of the present disclosure provides a computer program product comprising instructions that, when executed by a processor, cause the processor to execute the video sharing method of any one of the above embodiments.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

FIGS. 6A and 6B are schematic diagrams of a filling page of video customization information provided in the present disclosure.

FIG. 13 is a flowchart of another video acquisition method provided in the present disclosure.

FIGS. 14A to 14C are schematic diagrams of a filling page of video customization information provided in the present disclosure.

FIGS. 23A to 23C are schematic diagrams of a detail page of the second user provided in the present disclosure.

FIGS. 24A and 24B are schematic diagrams of a video shooting page provided in the present disclosure.

FIGS. 28A and 28B are schematic diagrams of a request list page provided in the present disclosure.

FIG. 29 is a schematic diagram of the structure of a video sharing apparatus provided in the present disclosure.

DETAILED DESCRIPTION

Figure 1:
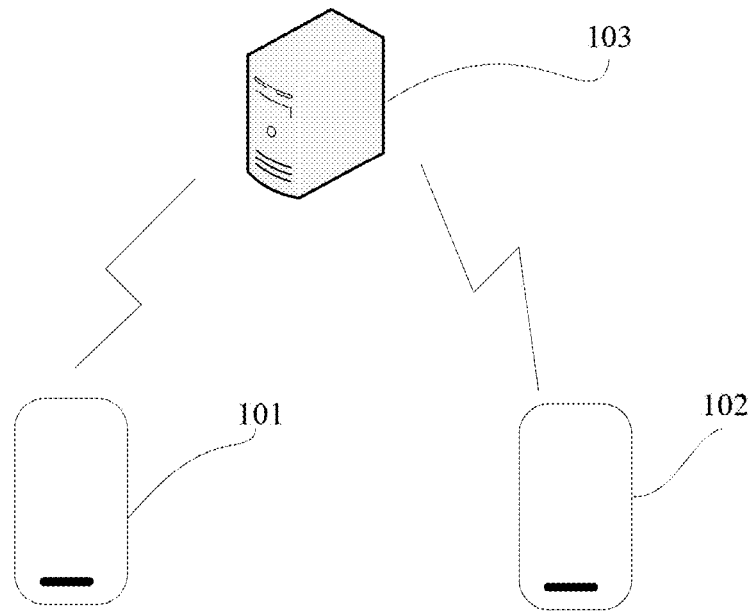
FIG. 1 is a schematic diagram of a system architecture provided in the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

It is difficult for video publishers to determine who will watch their videos before the videos are published, that is, there is uncertainty about the video viewers. As a result, the recorded videos often do not take into account the personalized needs of video viewers, i.e. the videos provided are not customized. However, there may be some video viewers who have found their preferred video providers by watching videos posted by those video providers, and who may want the video providers to share some customized video to meet their personal needs. If video viewers want to obtain customized video to meet their personal needs from a certain video provider, they need to download other additional applications, find a page of the video provider in those applications and enter their demand information to obtain customized video taken by the video provider to meet their personal needs.

However, according to the methods in relevant technology, users need to install several applications on their electronic devices to get customized video meeting their personal needs from their preferred video providers. The above operations are complex and may lead to poor user experience.

To address the above technical problem, this disclosure provides a video acquisition method, a video sharing method, an apparatus, a device, and a medium.

This disclosure also provides a technical solution for video sharing that allows a video provider to share non-customized video with video viewers, or customized video taken for specific viewers to meet their personal needs within the same application. Accordingly, video viewers can watch non-customized video shared by video providers, or customized video meeting their personal needs obtained from some video providers within the same application. Therefore, the technical solution for video acquisition and video sharing provided in this disclosure does not require video providers or video viewers to switch between multiple applications to meet their different needs, thereby improving the user experience.

In the following embodiments of this disclosure, for ease of description, the video viewer is referred to as the first user, the application client used by the first user is referred to as the first client; the video provider is referred to as the second user, and the application client used by the second user is referred to as the second client. The first client and second client are clients of the same application.

FIG. 1 is a schematic diagram of a system architecture provided in the present disclosure, wherein the system comprises a first client 101, a second client 102, and a server 103. In the present disclosure, the first client 101 and the second client 102 communicate through the server 103. For ease of description, this disclosure simply describes that the first client directly sends a message to the second client and receives a message sent by the second client; the second client sends a message to the first client or receives a message sent by the first client. It can be understood that the communication is actually performed through the server.

It should be noted that page name or button name used in this disclosure are examples only, and may be replaced by other names that implement equivalent functionality, which is not limited by this disclosure.

The customized video in this disclosure is taken by the second user on the second client.

The selection instructions or other operation instructions involved in the following embodiments of this disclosure can be achieved through clicking (single click, double click), sliding, mid-air gesture, voice input, or facial expression recognition input, etc. The specific operation location can be determined according to the specific application scenarios, for example, it can be a button, a link, or a region. One of the above methods is used as an example in the following embodiments for explanation.

Various aspects of the technical solution of the present disclosure will be described below with reference to specific embodiments.

Figure 2:
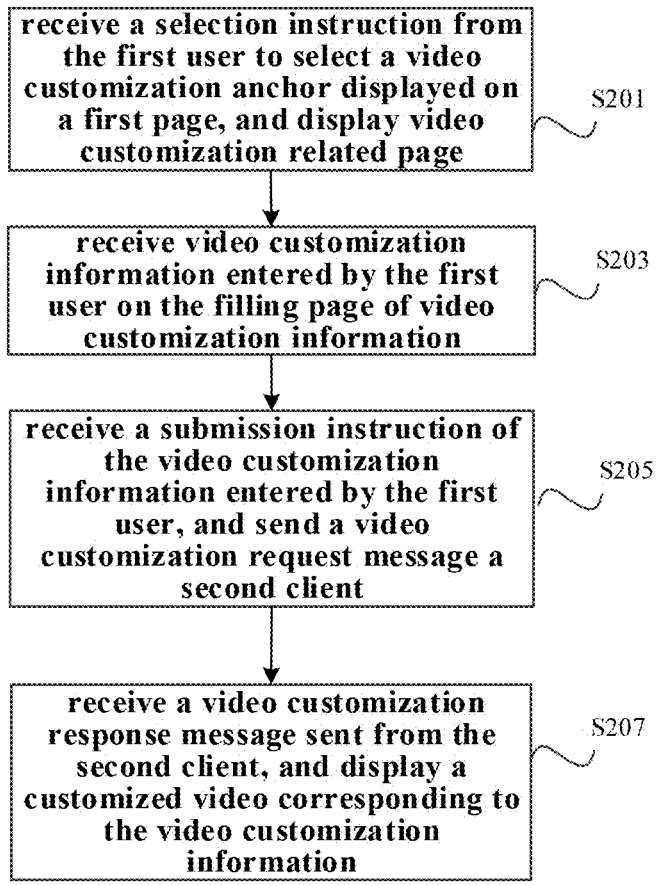
FIG. 2 is a flowchart of a video acquisition method provided in the present disclosure.

FIG. 2 is a flowchart of a video acquisition method provided in the present disclosure. This embodiment is carried out by a first client, which is used by a first user to acquire non-customized video and customized video shared by a second user. The method of this embodiment comprises the follows steps.

In S201, a selection instruction is received from the first user to select a video customization anchor displayed on a first page, and display video customization related page.

The video customization related page comprise: a filling page of video customization information.

The first page displays non-customized video shared by the second user.

Figure 3:
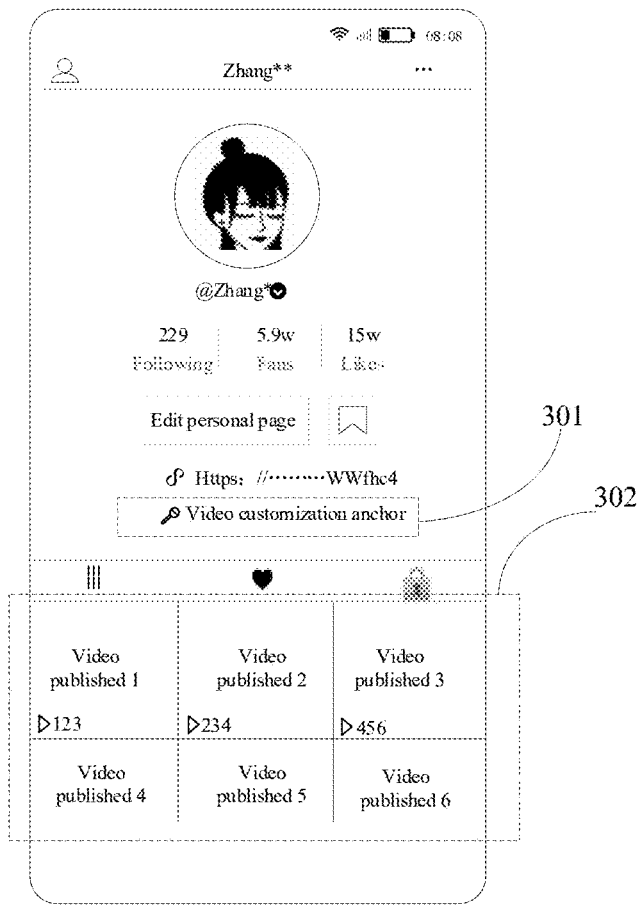
FIG. 3 is a schematic diagram of a personal detail page of the second user provided in the present disclosure.

In an implementation, the first page may be a Personal detail page of the second user. As shown in FIG. 3, a video customization anchor 301 is displayed on the Personal detail page of the second user, and non-customized video 302 shared by the second user. The video customization anchor may be a link or button. As shown in FIG. 3, it is shown as a link as an example. The first user can input the selection instruction by clicking on the video customization anchor.

In another implementation, the first page is a video playing page of non-customized video of the second user. The first user can first enter the Personal detail page of the second user, select a non-customized video on the Personal detail page, and then enter the video playing page.

Figure 4:
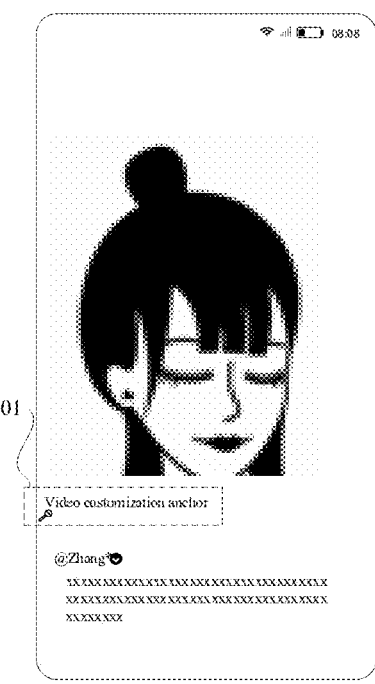
FIG. 4 is a schematic diagram of a video playing page of non-customized video of the second user provided in the present disclosure.

The video playing page of non-customized video of the second user is shown in FIG. 4. The video customization anchor 401 is displayed on the video playing page of non-customized video of the second user. FIG. 4 shows a single anchor that only points to a specific function, as an example. For example, the video customization anchor in this disclosure points to a video customization function. By providing a single anchor, a user is enabled to quickly enter a function page corresponding to the single anchor, thereby improving the user experience.

Figure 5A:
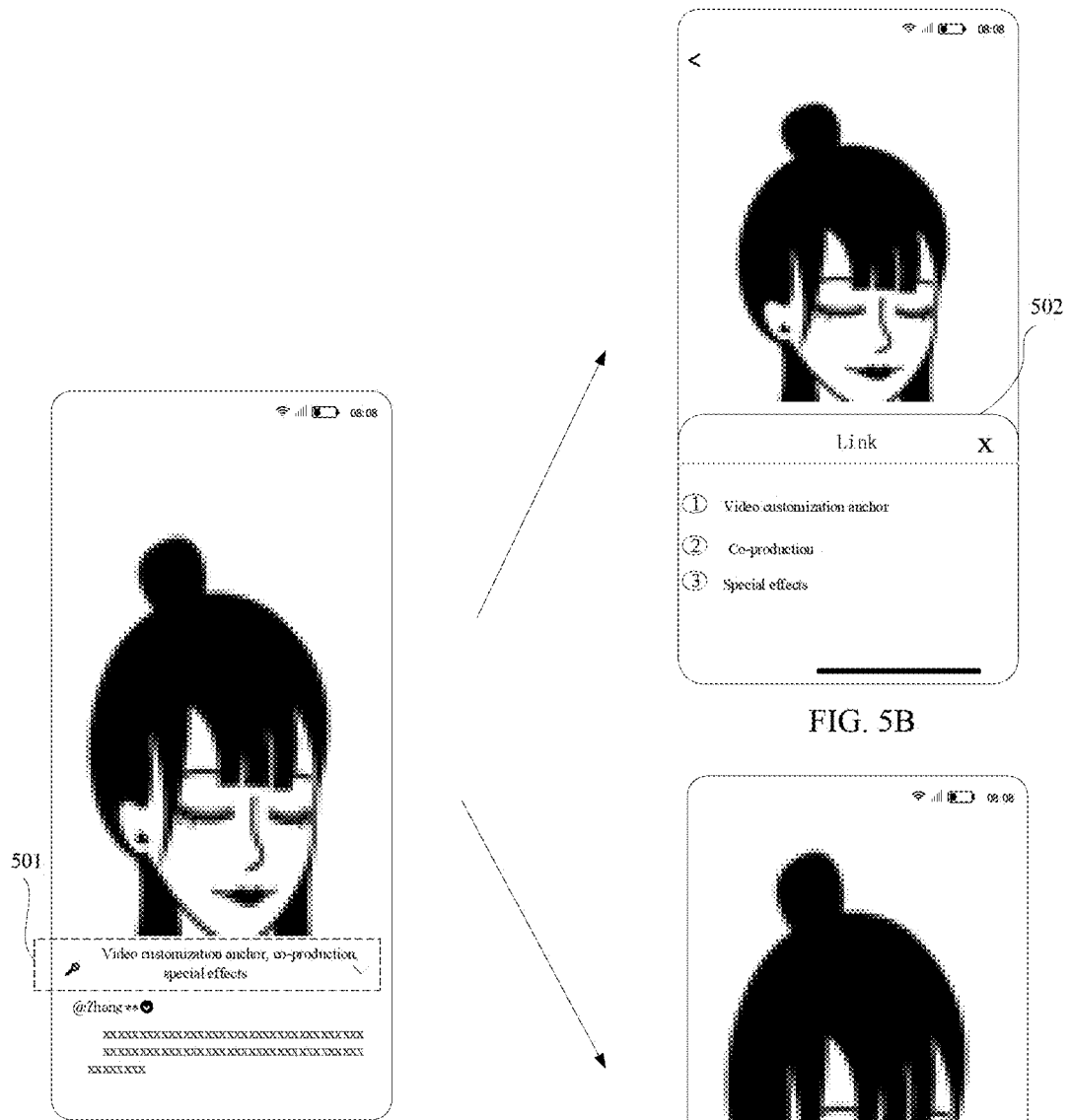
FIGS. 5A to 5C are schematic diagrams of the video playing page of non-customized video of the second user provided in the present disclosure.
Figure 5B:
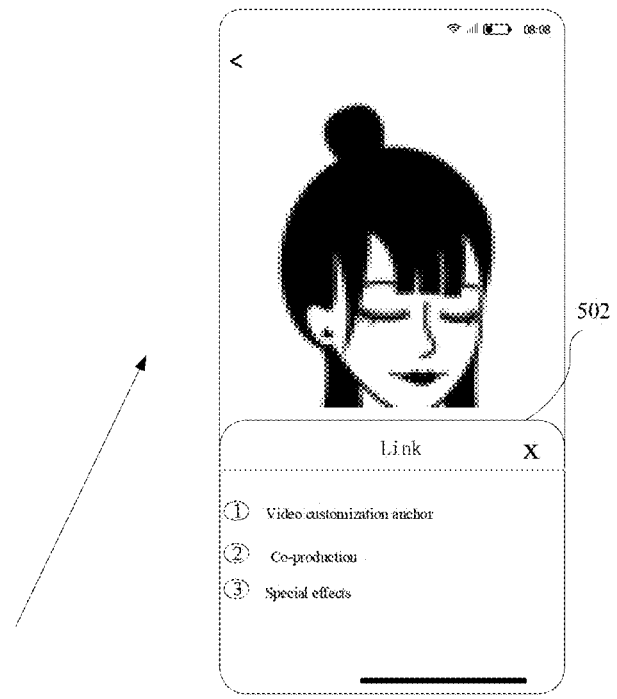
Figure 5C:
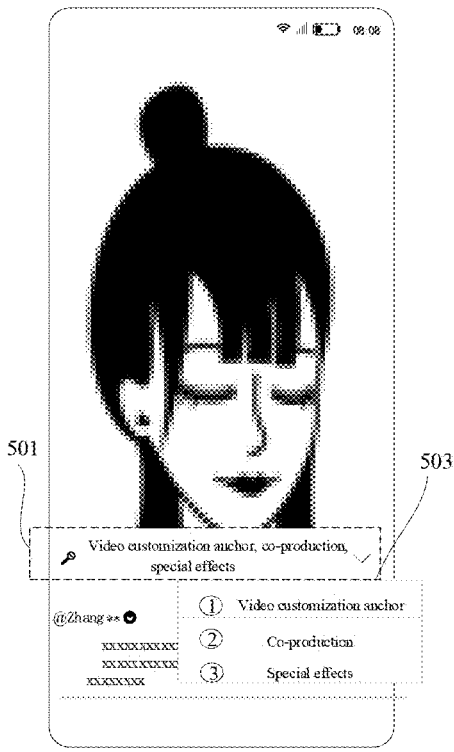

The video playing page of non-customized video of the second user may also be shown as FIG. 5A, which displays a combined anchor 501 pointing to multiple functions, such as, video customization, co-production, and special effects. In a case, the combined anchor can be selected by clicking on the combined anchor, and then an Anchor presentation page 502 corresponding to the combined anchor is displayed, as shown in FIG. 5B. The Anchor presentation page displays multiple anchors separately, the multiple anchors comprising a video customization anchor. A selection instruction can be entered by clicking on the video customization anchor. The arrangement of each anchor on the Anchor presentation page is not specifically limited. In FIG. 5B, a list is shown as an example. The Anchor presentation page can be overlaid on an Introduction Video page in half-screen mode. It is also possible to display the Anchor presentation page in full screen mode. FIG. 5B shows a half-screen display overlaid on the Introduction Video page, as an example. By arranging the combined anchor in this way, the area of the video playing page blocked by the multiple anchors is reduced, thereby improving the user experience and allowing more anchors to be provided on the video playing page. In another case, a drop-down arrow can be placed at one end of the combined anchor. By clicking on the combined anchor or the drop-down arrow, a drop-down list 503 will be displayed. As shown in FIG. 5C, the drop-down list comprises various anchors, comprising a video customization anchor. By clicking on the video customization anchor, a selection instruction can be entered.

After selecting the video customization anchor, video customization related page will be displayed. The video customization related page may be a group of pages related to video customization, and may comprise one or more pages, which is not specifically limited in the present disclosure.

Figures 6A, 6B:
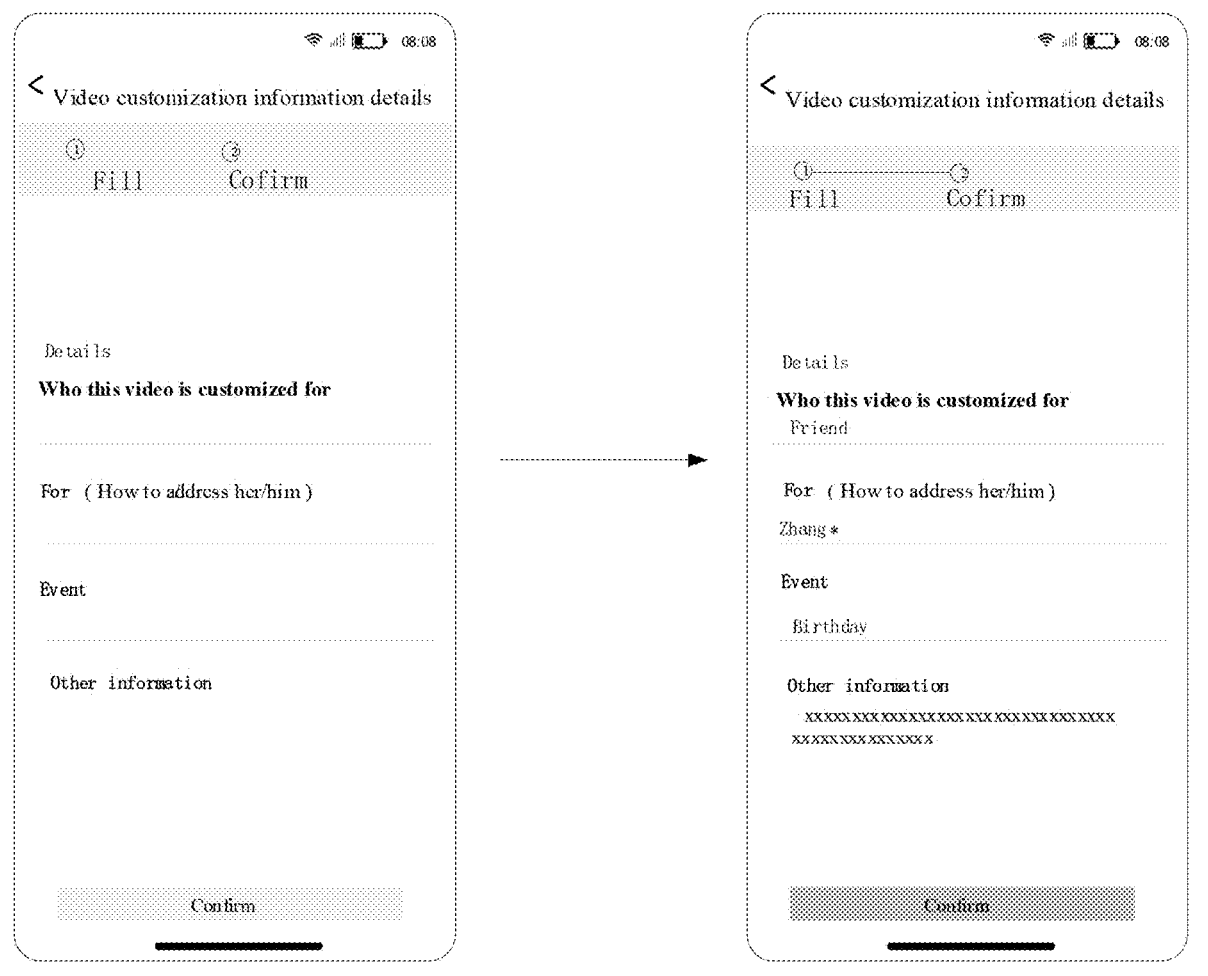

The video customization related page comprises: a filling page of video customization information for entering video customization information by the first user. As long as an interface is provided for the first user to enter video customization information, it can be considered as a filling page of video customization information. The specific form of the filling page of video customization information and its specific content can be designed according to the actual application scenarios, which is not specifically limited in the present disclosure. For example, as shown in FIG. 6A, the filling page of video customization information may comprise: "Who this video is customized for", "How to address her/him", "Because of what event", and other information.

In S203, video customization information entered by the first user on the filling page of video customization information is received.

The first user enters video customization information on the filling page of video customization information through selecting from options, keyboard input, handwriting input, or voice input, etc, which is not specifically limited in this disclosure. After entering the video customization information, as shown in FIG. 6B, the filling page of video customization information indicates that this video is customized for a "Friend" named "Zhang *" because of a "Birthday" event. Blessings or other customization requirements can be entered as other Information.

The page name and page layout in FIGS. 6A and 6B are merely examples. There are no limitations on the specific page name and page layout in this disclosure, as long as video customization information can be entered on the page.

It should be noted that if there is more video customization information, the entire content of the filling page of video customization information can be displayed by scoring the page up and down, or the entire content of the filling page of video customization information can be displayed on multiple pages that can be switched by a Next button, a drop-down arrow, or a Back arrow, etc.

In S205, a submission instruction of the video customization information entered by the first user is received, and a video customization request message is sent to a second client.

The video customization request message comprises the video customization information.

After the first user enters the video customization information, a submission instruction of the video customization information is entered. For example, in FIG. 6B, a Confirm button is displayed. The first user can click the Confirm button to enter a submission instruction of the video customization information, which triggers the sending of a video customization request message to the second client.

In S207, a video customization response message sent from the second client is received, and a customized video corresponding to the video customization information is displayed.

The video customization response message comprises the customized video.

After the second client receives the video customization request message, the second user will record a corresponding customized video based on the video customization information and send a video customization response message to the first client. The first client receives the video customization response message and displays the customized video corresponding to the video customization information.

The first client can receive the video customization response message sent by the second client in the following possible ways.

For examples, the first user can view the video customization response message sent by the second client through a message.

Figure 7:
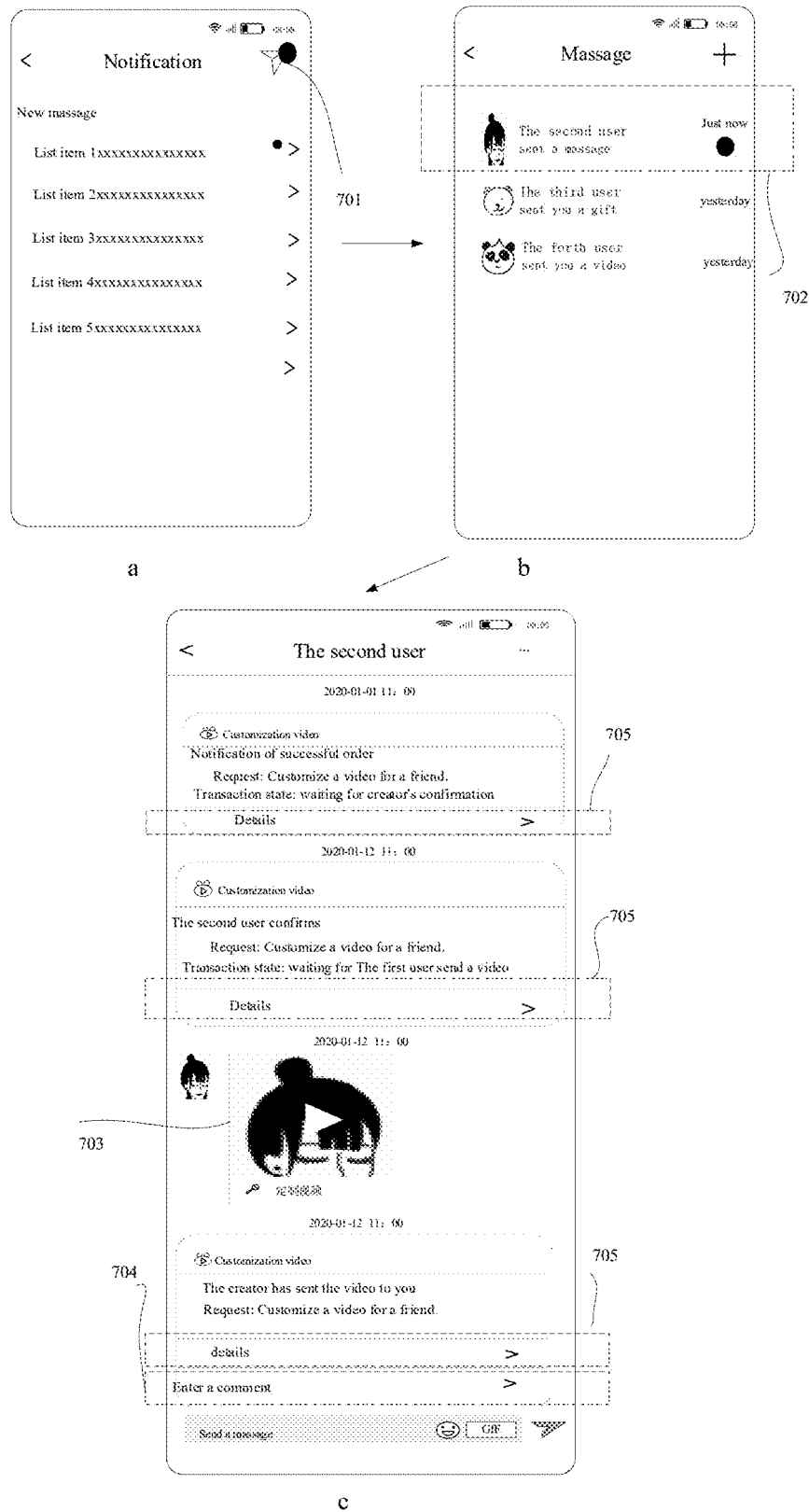
FIG. 7A is a schematic diagram of a notification page provided in the present disclosure.
FIG. 7B is a schematic diagram of a message page provided in the present disclosure.
FIG. 7C is a schematic diagram of a dialog box of the second user provided in the present disclosure.

Optionally, in one implementation, when the first user receives a new message, a Prompt message 701 (such as a numeric bubble) is displayed on a Notification page of the first user, as shown in FIG. 7A. The first user clicks the Prompt message 701 to enter a Message page, as shown in FIG. 7B. The first user selects the message item 702 of the second user on the message page, and enters a dialog box with the second user as shown in FIG. 7C, in which the customized video 703 is displayed. In another implementation, the first user can enter the Personal detail page of the second user, on which a Message button is displayed. The first user can click the Message button to directly enter the dialog box with the second user, as shown in FIG. 7C.

In this embodiment, the first client receives a selection instruction from the first user to select a video customization anchor displayed on a first page and displays video customization related page, which comprise a filling page of video customization information; the first client receives video customization information entered by the first user on the filling page of video customization information and sends a video customization request message to the second client; the first client receives a video customization response message sent by the second client and displays a customized video corresponding to the video customization information. The first page displays non-customized video of the second user, so that the first user can acquire non-customized video and customized video shared by the second user in a client of the same application. Therefore, the first user does not have to switch between clients of different applications to meet different needs, which can improve the user experience.

In addition, since the second user can shoot and produce both non-customized and customized video within the same client, a set of video processing functions, such as editing functions, special effects, etc. can be shared, which can increase video diversity, and enable the first user to get diverse videos.

Figure 8:
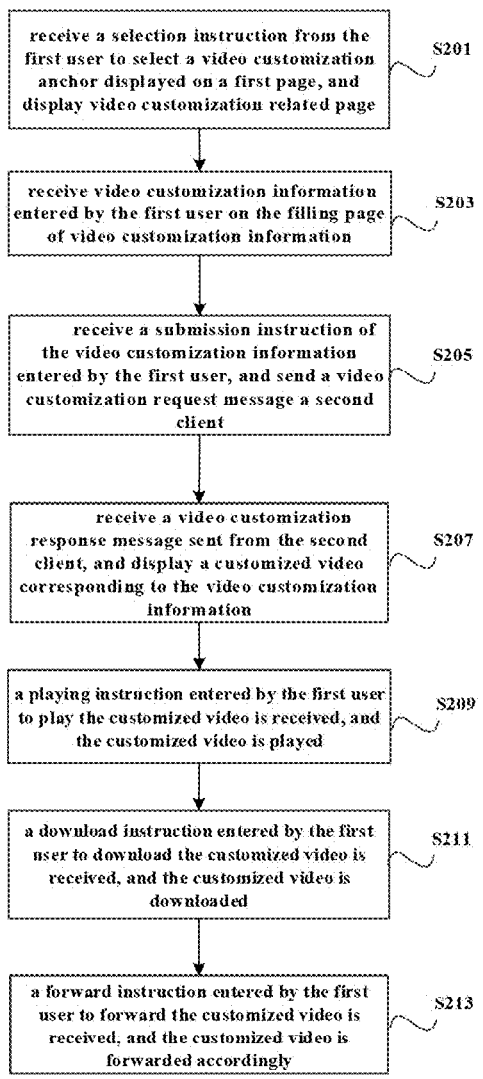
FIG. 8 is a flowchart of another video acquisition method provided in the present disclosure.

FIG. 8 is a flowchart of another video acquisition method provided in the present disclosure. Based on the embodiment shown in FIG. 2, FIG. 8 further comprises the following steps after S207.

In S209, a playing instruction entered by the first user to play the customized video is received, and the customized video is played.

Optionally, the first user can enter a playing instruction by clicking on the customized video to play the customized video. For example, on the basis of FIG. 7C, after clicking on the customized video, as shown in FIG. 9, the customized video is played.

In S211, a download instruction entered by the first user to download the customized video is received, and the customized video is downloaded.

Figure 9:
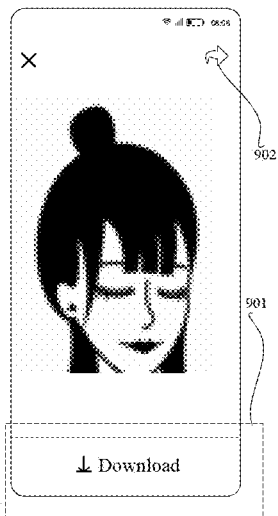
FIG. 9 is a schematic diagram of playing a customized video provided in the present disclosure.

Optionally, a button for video download may also be displayed as shown in FIG. 9. The user can enter a download instruction by clicking the Download Video button 901 to download the customized video to a local device or to a cloud account of the first user, such that the first user can save or forward the customized video.

In S213, a forward instruction entered by the first user to forward the customized video is received, and the customized video is forwarded accordingly.

Optionally, the user can directly forward the customized video to others. For example, the user can enter a forward instruction by clicking on the Forward guideline item 902 in the upper right corner in FIG. 9. The user can also long press at any position of the customized video 703 shown in FIG. 7C; When a "Forward" option appears on the interface, the "Forward" option can be selected to display available forwarding manners, which may comprise, but is not limited to, email, SMS, and other instant messaging software, thereby improving the convenience of forwarding the customized video. In addition, the user may also long press at any position on the video playback interface shown in FIG. 9; When the "Forward" option appears on the interface, the customized video can be forwarded to other users of this application or other applications.

The above steps S209, S211 and S213 can be selectively executed based on the user's input operations, and the order of execution also depends on the input operations of the user, which is not limited in the present disclosure.

In this embodiment, by receiving a playing instruction entered by the first user to play the customized video, the customized video can be played directly without downloading, which can improve the convenience of playing the customized video; a download instruction entered by the first user to download the customized video is received, and the customized video is downloaded, which can facilitate the storage and forwarding of the video; a forward instruction entered by the first user to forward the customized video is received, and the customized video is forwarded accordingly, so that the convenience of forwarding can be improved.

Figure 10:
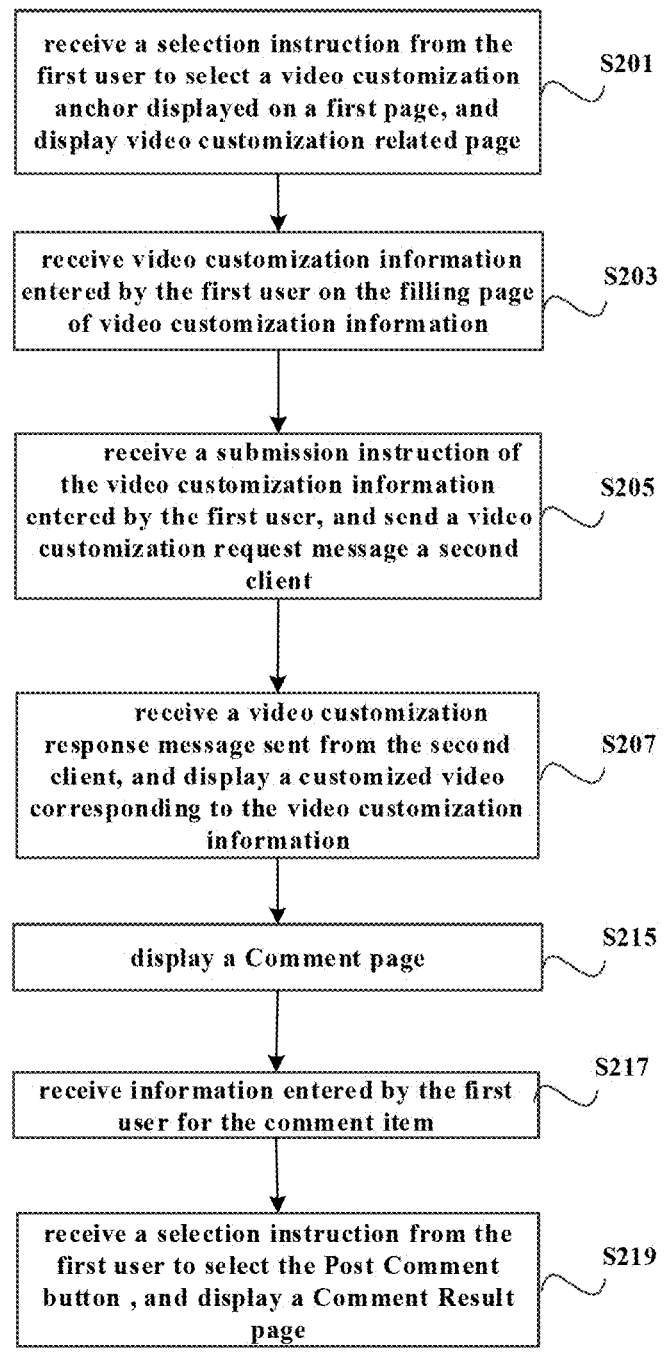
FIG. 10 is a flowchart of another video acquisition method provided in the present disclosure.

FIG. 10 is a flowchart of another video acquisition method provided in the present disclosure. Based on the embodiments shown in FIG. 2 or 8, FIG. 10 further comprises the following steps after S207.

In S215, a Comment page is displayed.

The Comment page comprises a Comment item and a Post Comment button.

Optionally, the user can access the Comment page in the following ways.

In one way, as shown in FIG. 7C, in the dialog box with the second user, after the second client sends the customized video, the system displays a prompt message comprising a Comment input guide item 704. After the user clicks the Comment input guide item, a Comment page is displayed.

Figure 11:
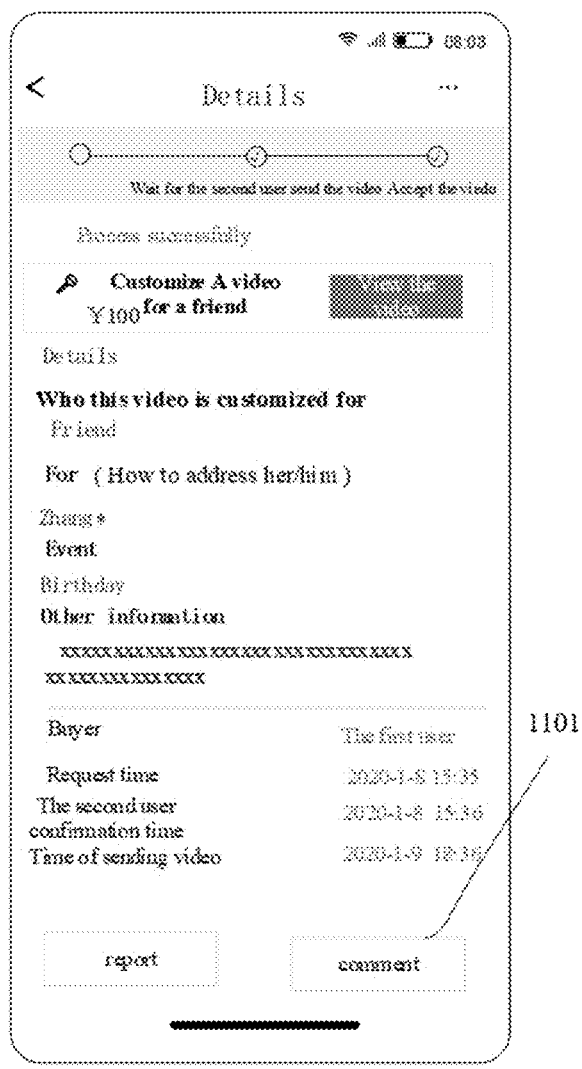
FIG. 11 is a schematic diagram of a detail page provided in the present disclosure.

In another way, after the user clicks Detail guide item 705 within the prompt message, a Detail page is displayed, as shown in FIG. 11. A Comment button 1101 is displayed on the Detail page. After the user clicks the Comment button, a Comment page is displayed.

Figure 12:
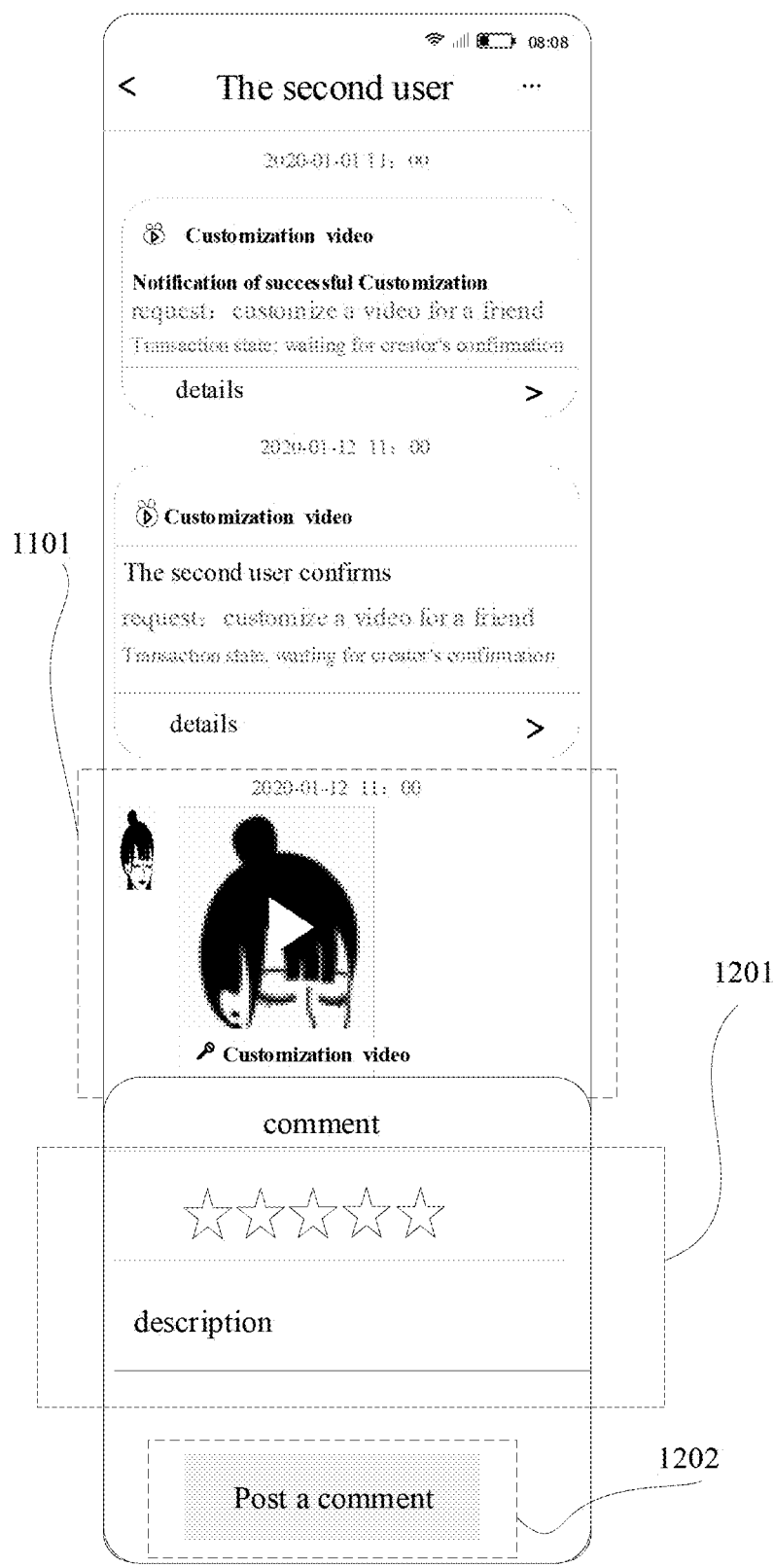
FIG. 12 is a schematic diagram of a comment page provided in the present disclosure.

The Comment page can be displayed in half screen or full screen mode. FIG. 12 shows an example in which the Comment page is displayed in half screen mode based on FIG. 7C. As shown in FIG. 12, the Comment page comprises a Comment item 1201 and a Post Comment button 1202.

The comment information comprises at least one of selecting a star rating or entering text descriptions.

In S217, information entered by the first user for the comment item is received.

The first user enters information in the Comment item, such as selecting a star rating and/or entering text descriptions.

The Post Comment button is in a valid state after the user enters comment information for the Comment item. If the user does not enter any comment information, the Post Comment button is in an invalid state and cannot post a comment.

In S219, a selection instruction from the first user to select the Post Comment button is received, and a Comment Result page is displayed.

The Comment Result page displays the comment state, which is either successful or failed. Optionally, if the comment state is successful, the comment information can also be displayed or a View Comment button can be displayed. The first user can click the View Comment button to view the comment information entered. After a successful comment, when the first user clicks the Comment button again, the comment information is directly displayed.

In this embodiment, by displaying a Comment page that comprises a Comment item and a Post Comment button, receiving input information from the first user for the comment item, receiving a selection instruction from the first user to select the Post Comment button, and displaying a Comment Result page, the first user can provide comments on the customized video provided by the second user, thereby increasing the interactivity between the first and second users. In addition, the comments can be used as a reference for the second user and other users to improve the quality of their customized video.

FIG. 13 is a flowchart of another video acquisition method provided in the present disclosure. Based on the embodiments shown in FIG. 2, 8, or 10, FIG. 13 further illustrates that the customized video provided in the present disclosure may be a paid video. Therefore, the first user also needs to pay virtual currency set by an application or physical currency to the second user. Therefore, before S207, the method may further comprise the following steps.

In S2061, a transaction page is displayed to receive a transaction instruction entered by the first user.

Optionally, before displaying the transaction page, the filling page of video customization information shown in FIGS. 14A, 14B, and 14C can be displayed. FIG. 14A shows the state of the filling page of video customization information when the video customization information is not filled, FIG. 14B shows the state when the filling page of video customization information is completed, and FIG. 14C shows the state of waiting for confirmation and payment after the filling page of video customization information is completed. FIG. 14C also displays account information of the first user, for example, the current balance and the remaining balance after payment. There are two situations, sufficient balance and insufficient balance. If the balance is sufficient, after a selection instruction is received from the first user to select the Confirm Payment button, the transaction page is directly displayed. If the balance is insufficient, after a selection instruction is received from the first user to select the Confirm Payment button, a Top-up page is first displayed, and then the transaction page is displayed.

In S2062, a transaction result of the first user is obtained, and it is determined that the transaction result of the first user indicates a successful payment.

The specific form of the transaction page or how users perform payment is not limited by this disclosure. The video customization information does not take effect until the second client confirms that the first user has made a successful payment.

In this embodiment, by displaying the transaction page, receiving a transaction instruction entered by the first user, acquiring the transaction result of the first user, and determining that the transaction result of the first user indicates a successful payment before taking the video customization information into effect, paid video sharing can be achieved, and the user experience can be improved.

Figure 15:
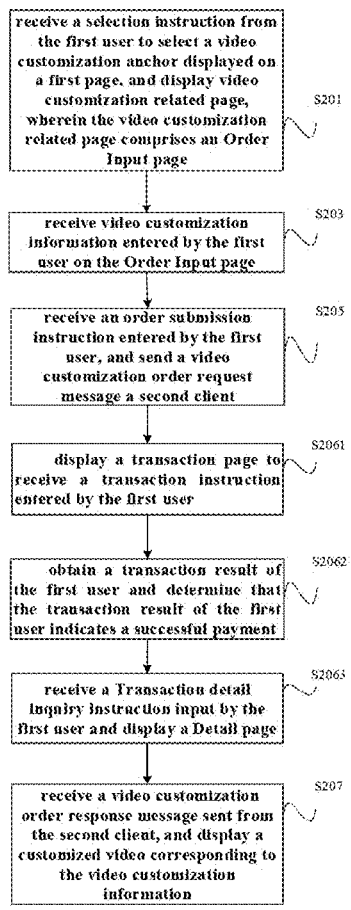
FIG. 15 is a flowchart of another video acquisition method provided in the present disclosure.

FIG. 15 is a flowchart of another video acquisition method provided in the present disclosure. Based on the above embodiments, FIG. 15 further comprises steps of viewing details after S205.

In S2063, a Transaction detail inquiry instruction input by the first user is received and a Detail page is displayed.

The Details page comprises transaction state information.

The first user can query the Detail page through the following methods, among others.

As a possible implementation, the first user enters the Message page, as shown in FIG. 7B, and inputs a selection instruction to select the message of the second user. As a result, a dialog box with the second user is displayed, as shown in FIG. 7C, wherein some prompt messages with Detail guide items 705 are displayed in the dialog box with the second user. The first user can input a selection instruction to select the Detail guide item, to display the Detail page.

As another possible implementation, the first user can enter the Personal detail page of the second user, on which a Message button is provided. The first user can select the Message button to directly enter the dialog box with the second user, as shown in FIG. 7C, wherein some prompt messages with Detail guide items 705 are displayed in the dialog box. The first user can input a selection instruction to select the Detail guide item, to display the Detail page.

Figure 16A:
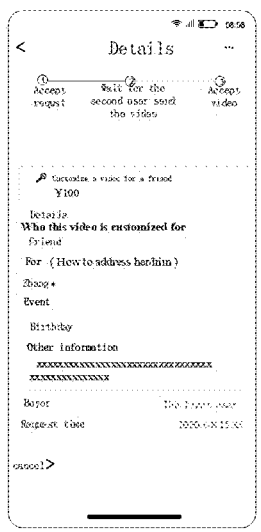
FIGS. 16A to 16C are schematic diagrams of a detail page provided in the present disclosure.
Figure 16B:
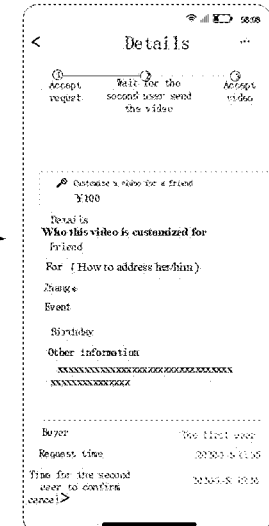
Figure 16C:
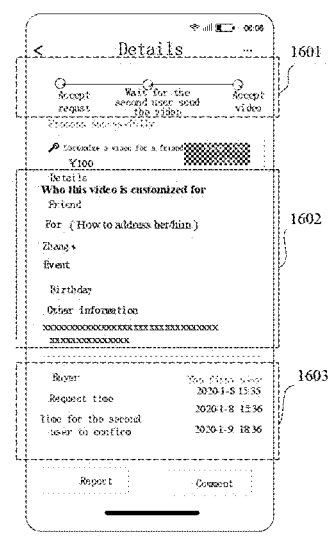

Different Detail pages are displayed at different times depending on the operations of the first and second users, as shown in FIGS. 16A-16C. FIG. 16A is a schematic diagram of the Detail page displayed when waiting for the second user to accept the request, and FIG. 16B is a schematic diagram of the Detail page displayed when waiting for the second user to send a customized video after the second user has accepted the request, and FIG. 16C is a schematic diagram of the Detail page displayed if the customized video has been sent by the second user. The Detail page also displays transaction progress information and video customization information, wherein the transaction progress information comprises at least one of a transaction progress bar or a transaction progress time list. As an example as shown in FIG. 16C, the transaction progress information comprises a transaction progress bar 1601, video customization information 1602, and a progress time list 1603. The transaction progress bar comprises progress node. For example, the transaction progress bar comprises three progress nodes, namely "request accepted", "waiting for the second user to send video", and "video received". The video customization information comprises, for example, "Who this video is customized for", "How to address him/her", and other information. The progress time list comprises, for example, request time: 2020-1-8, 15:35; time when the second user performs confirmation: Jan. 8, 2020, 15:36; time when the video is sent: Jan. 9, 2020 at 18:36.

The state of the Detail page is updated based on the operations of the first or second user. Optionally, an expiration time can be set for each stage of the transaction. If the second user takes no action before the expiration time, the transaction is automatically canceled. For example, if the request is accepted by the second user within a first expiration time (such as 48 hours), a transaction state change is triggered, and the transaction state is changed to "request accepted", as shown in FIG. 16B. If the request is not accepted by the second user within the first expiration time, a transaction state change is triggered and the transaction state is changed to "transaction canceled", with a reason of transaction cancellation displayed, such as "The request is not accepted by the second user within the first expiration time", for example. If the second user sends a customized video within a second expiration time (such as 168 hours), a transaction state change is triggered, and the transaction state is changed to "video is sent by the second user", as shown in FIG. 16C. If a customized video is not sent by the second user within the second expiration time, a transaction state change is triggered, and the transaction state is changed to "transaction canceled", with a reason of transaction cancellation displayed, such as "The customized video is not sent by the second user within the second expiration time", for example. The second user can also reject the request. If the second user refuses to accept the request, a transaction state change is triggered, and the transaction state is changed to "transaction canceled", with a reason of transaction cancellation displayed, such as "The request is refused by the second user", for example.

Optionally, the first user can also actively cancel the transaction before the second user sends a customized video. For example, a cancellation item is provided in both FIGS. 16A and 16B. The first user can click the cancellation item to actively cancel the transaction. After the transaction is canceled, the transaction state is changed to "transaction canceled" with a reason displayed, such as "The transaction is canceled by the first user". Optionally, a cancellation reason dialog box can also be displayed after the first user selects the cancellation item, which comprises multiple cancellation reasons and a Confirm Cancellation button. Correspondingly, a specific cancellation reason selected by the first user can be displayed as the cancellation reason. By acquiring the reason for the user canceled the transaction, it is possible to provide a reference for improving the video customization function.

When the transaction state changes, a new prompt message appears in the dialog box between the first user and the second user.

In this embodiment, by receiving the Transaction detail inquiry instruction input by the first user, a Detail page is displayed to enable the first user to timely know the transaction details, thereby improving the user experience.

Figure 17:
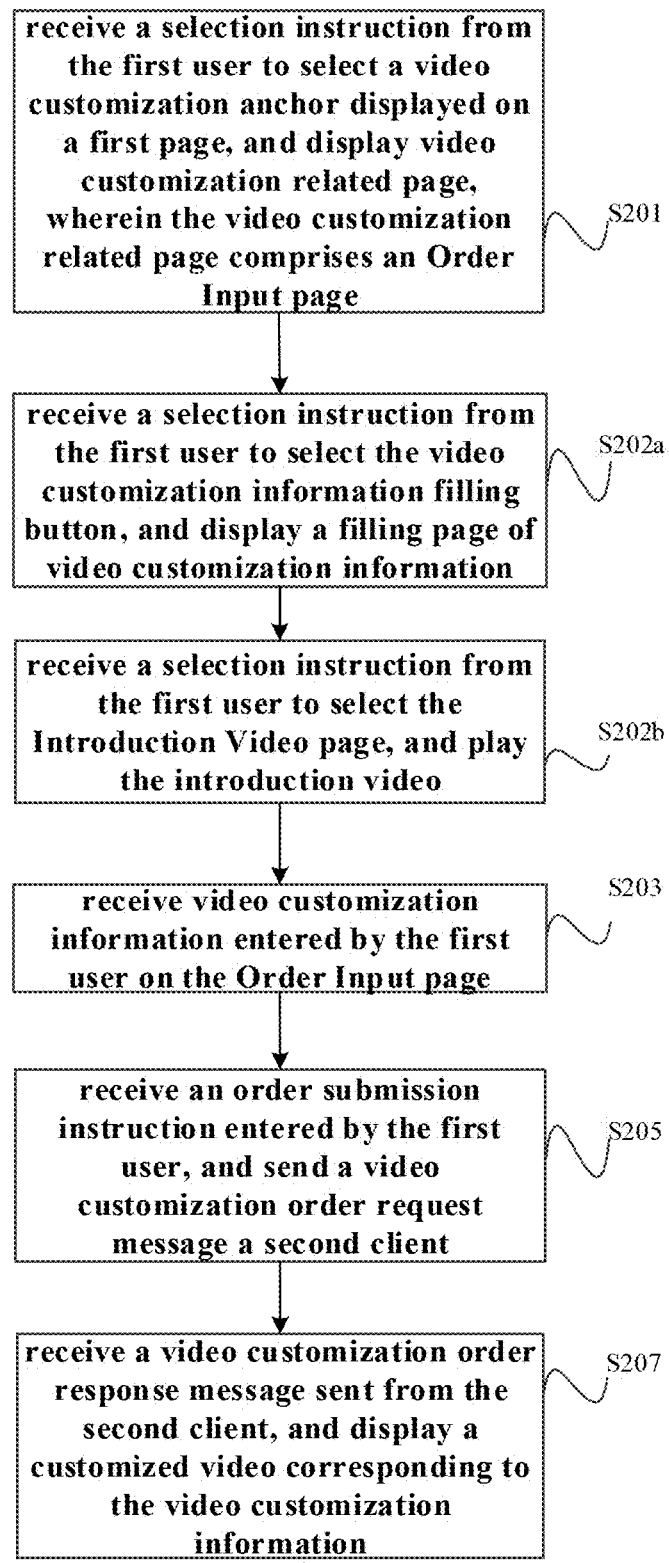
FIG. 17 is a flowchart of another video acquisition method provided in the present disclosure.

FIG. 17 is a flowchart of still another video acquisition method provided in the present disclosure. Based on the above embodiments, the video customization related page in FIG. 17 further comprise a first introduction page comprising an Introduction Video page for displaying an introduction video and a Description page for displaying a video customization information filling button. The method further comprises the following steps before S203.

In S202a, a selection instruction is received from the first user to select the video customization information filling button, and a filling page of video customization information is displayed.

Figure 18:
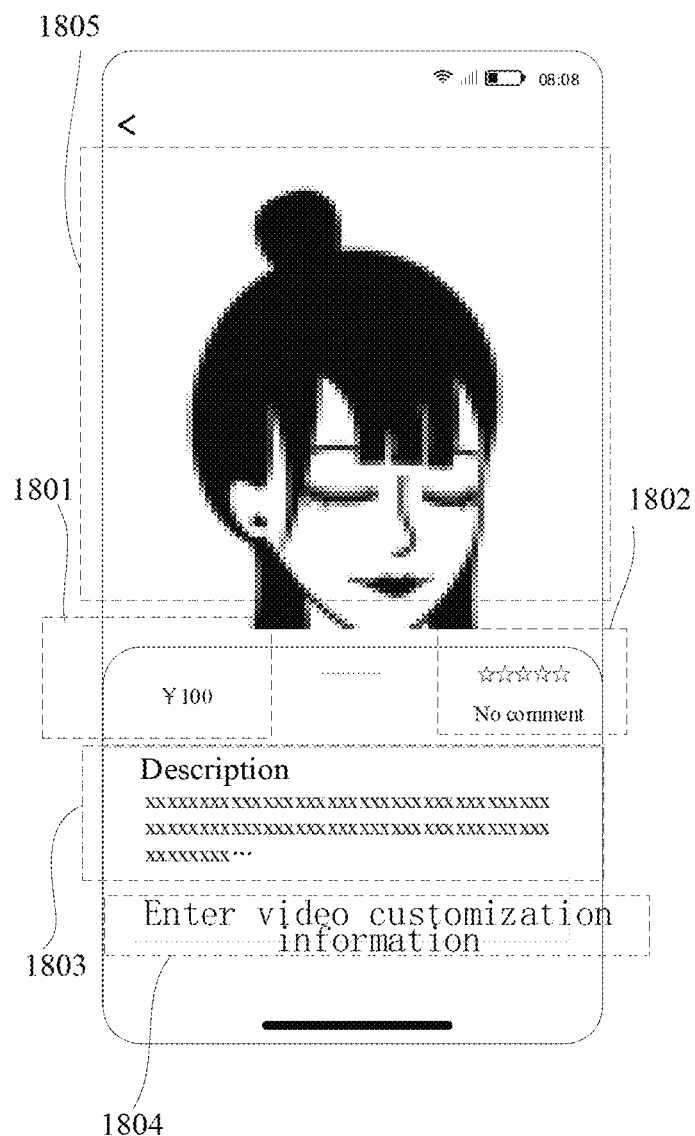
FIG. 18 is a schematic diagram of a first introduction page provided in the present disclosure.

The first introduction page can be displayed in full screen or half screen mode. In the half screen mode, for example, the first description page is overlaid on the introduction video page and displayed on the top half screen, as shown in FIG. 18. The first description page displays video transaction information 1801, comment information 1802, description information 1803, and a video customization information filling button 1804. The video transaction information is used to indicate to the first user the fees that needs to be paid to obtain a customized video from the second user. The comment information is generated based on the historical comment information on customized video shared by the second user. The description information comprises some personal views of the second user. The first description page may also display other information, such as operation procedures and specific comment information. More information can be displayed by scoring or clicking the drop-down button, which is not specifically limited in the present disclosure.

The first user can input a selection instruction to select the video customization information filling button, which triggers the display of the filling page of video customization information. The filling page of video customization information has been described in the previous embodiments, and will not be repeated here.

In S202b, a selection instruction is received from the first user to select the Introduction Video page, and the introduction video is played.

The first user may input a selection instruction to select the Introduction Video page by clicking on a preset area 1805 of the Introduction page, to hide the first introduction page and play the introduction video.

The execution order of S202a and S202b is not limited, the display of which can be performed according to the user's operations.

In this embodiment, by displaying the first introduction page comprising the introduction video page and the first description page before displaying the filling page of video customization information, the first user can gain more understanding of the customized video shared by the second user before filling in the video customization information, thereby improving the user experience.

Optionally, if the second user stops accepting requests or exits the video customization function, when the first user selects the video customization anchor, the video customization information filling button displayed on the first description page of the first introduction page becomes invalid, meaning that the user cannot enter the filling page of video customization information. By switching the state of the video customization information filling button (valid or invalid), the first user can timely learn about the state information of the second user, avoiding useless operations of the first user (such as filling in video customization information), thereby improving the user experience.

Figure 19:
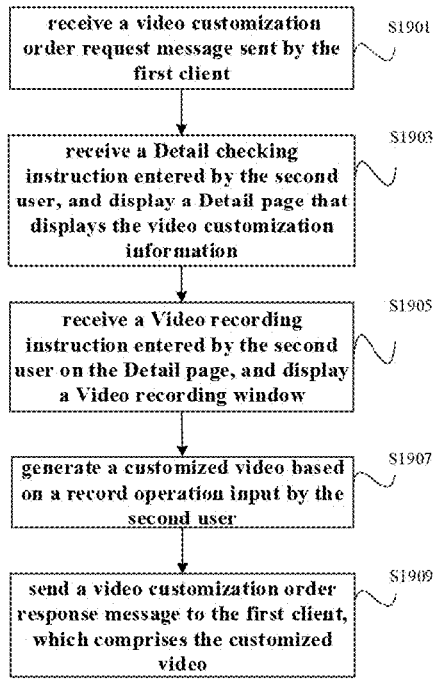
FIG. 19 is a flowchart of a video sharing method provided in the present disclosure.

FIG. 19 is a flowchart of a video sharing method provided in the present disclosure. The method of FIG. 19 is carried out by a second client, which is used by a second user to share non-customized video and customized video. As shown in FIG. 19, the method of this embodiment comprises the follows steps.

In S1901: a video customization request message sent by the first client is received.

The video customization request message comprises video customization information, and a corresponding Detail page is generated based on the video customization request message.

For the video customization information, reference can be made to the aforementioned embodiments, which will not be repeated here.

In S1903: a Detail checking instruction entered by the second user is received, and a Detail page that displays the video customization information is displayed.

The means of receiving the Detail checking instruction from the second user comprises, but is not limited to, the following implementations.

In a possible implementation, a selection instruction is received from the second user to select a Detail guide button displayed on a Request List page.

Figure 20:
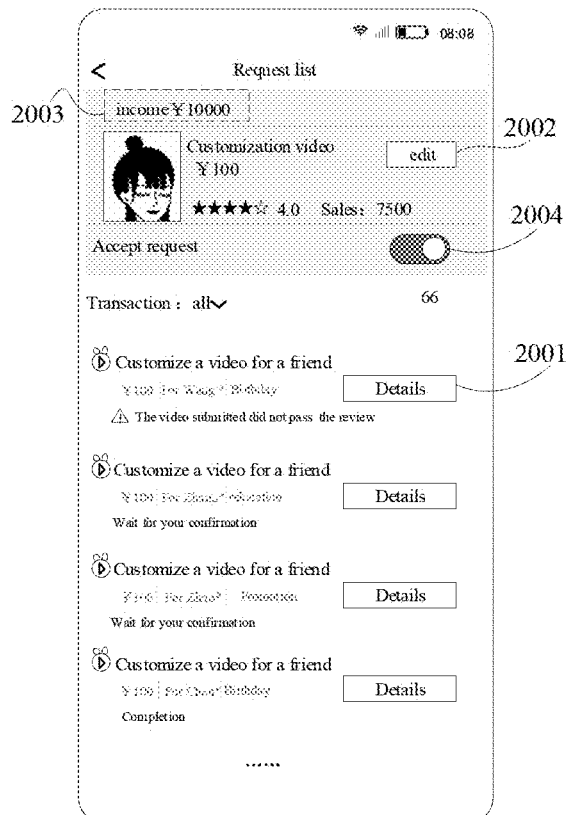
FIG. 20 is a schematic diagram of a request List page provided in the present disclosure.

The Request List page is shown in FIG. 20. At least one request is displayed on the Request List page, and each request corresponding to a Detail guide button 2001. When the second user wants to query the details of a certain request, the second user can access the Request List page and select the Detail guide button of a corresponding request to enter the Detail page.

Figure 21A:
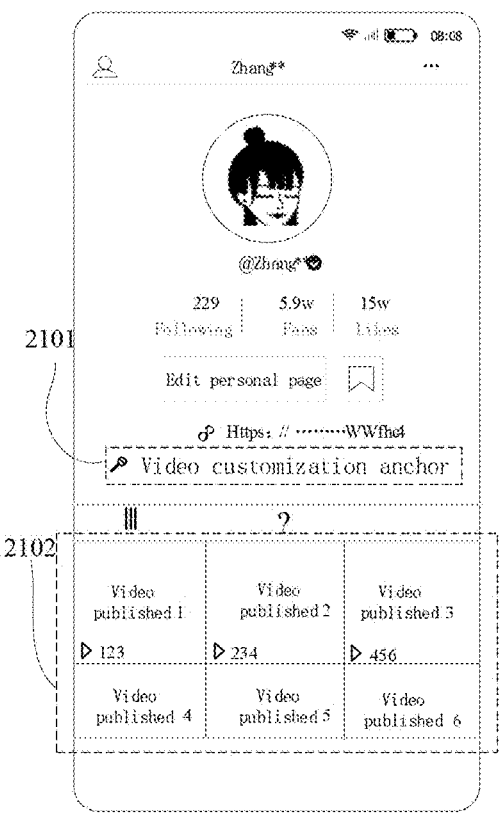
FIG. 21A is a schematic diagram of a personal information page of the second user provided in this disclosure.
Figure 21B:
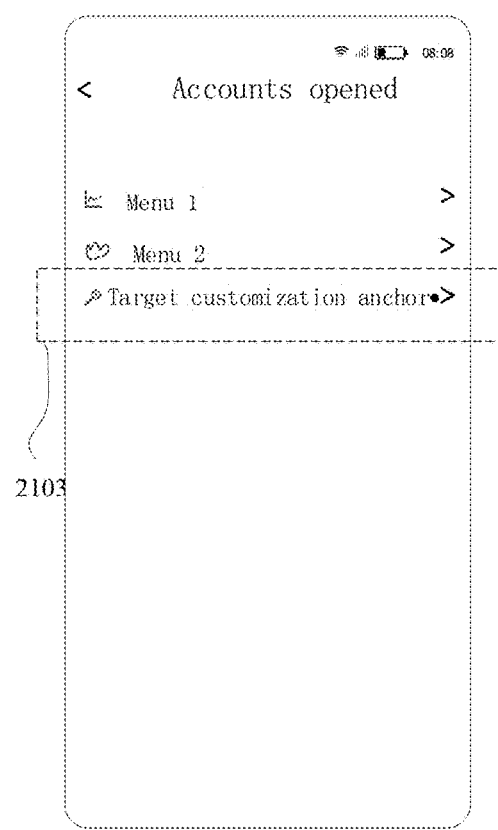
FIG. 21B is a schematic diagram of a user account page provided in the present disclosure.

Optionally, the Request List page can also be accessed in the following implementations. In one implementation, a selection instruction is received from the second user to select a video customization anchor displayed in a Personal detail page of the second user, and a Request List page is displayed. A Personal Information page of the second user is shown in FIG. 21A, in which a video customization anchor 2101 and non-customized video 2102 are displayed. After the second user selects the video customization anchor, the Request List page is displayed. Another implementation comprises receiving a selection instruction from the second user to select a video customization anchor on the User Account page and to display the Request List page. The User Account page with a video customization anchor 2103 is shown in FIG. 21B. The Request List page is displayed when the second user selects the video customization anchor. Another implementation comprises receiving a selection instruction from the second user to select a video customization anchor placed on a Video playing page of the second user and then to display the Request List page.

Another possible implementation comprises receiving a selection instruction from the second user to select a Detail guide button provided along with a prompt message displayed in a dialog box with the first user.

Figure 22A:
FIG. 22A is a schematic diagram of a dialog box of the first user provided in the present disclosure.

The dialog box with the first user is shown in FIG. 22A. As shown in the FIG. 22A, a prompt message with a Detail guide button 2201 is displayed in the display box. The second user can select the Detail guide button 2201 to enter the Detail page.

Optionally, the dialog box between the second user and the first user can be accessed in the following methods.

Figure 22B:
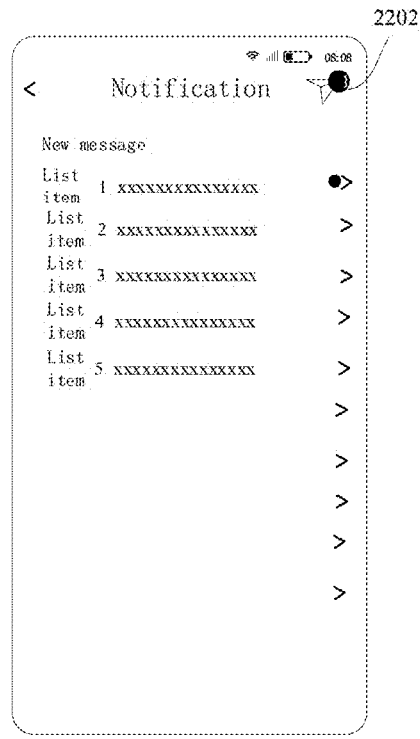
FIG. 22B is a schematic diagram of a notification page of the second user provided in this disclosure.
Figure 22C:
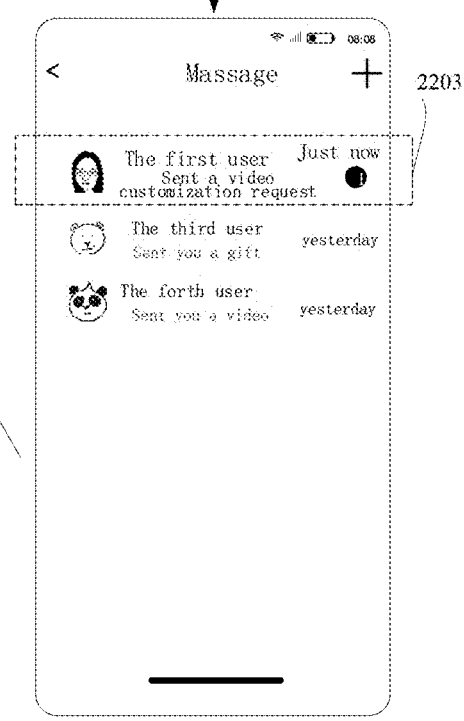
FIG. 22C is a schematic diagram of a message page of the second user provided in this disclosure.

One implementation comprises when the second user receives a new message, a Prompt message 2202 (such as a numeric bubble) being displayed on the Notification page of the second user, wherein the Notification page of the second user is shown in FIG. 22B. The first user can click the Prompt message to enter a Message page, as shown in FIG. 22C. The second user can select a message 2203 of the first user on the Message page to enter a dialog box with the first user as shown in FIG. 22A. In another implementation, the second user can enter a Personal detail page of the first user, on which a Message button is displayed. The second user can click the Message button to directly enter a dialog box with the first user, as shown in FIG. 22A.

The above Details page comprises video customization information comprising, for example, "Who this video is customized for", "How to address him/her", "Because of what event", and other information.

In S1905, a Video recording instruction entered by the second user on the Detail page is received, and a Video recording window is displayed.

In S1907, a customized video is generated based on a record operation input by the second user in the Video recording window.

After the second user receives the video customization information of the first user, a Video recording window is displayed in the current second client, the video is recorded, and a customized video is generated based on the recording operations of the second user.

In S1909, a video customization response message is sent to the first client, which comprises the customized video.

In this embodiment, the second client receives a video customization request message sent by the first client, which comprises video customization information. The second user inputs a detail viewing instruction to display a Detail page that shows the video customization information. The second user inputs a Video recording instruction to display a Video recording window in the current second client. A customized video is generated based on the recording operation of the second user. A video customization response message is sent to the first client, wherein the video customization response message comprises the customized video. Thus, the second user is allowed to shoot, produce, and share non-customized and customized video within the same application client. Therefore, the second user does not have to switch between clients of different applications to meet different needs, which can improve the user experience. In addition, since the second user can shoot and produce both non-customized and customized video within the same client, a set of video processing functions, such as editing functions, special effects, etc. can be shared for different videos, such that video diversity and resource utilization can be increased, and development costs can be saved.

In the video sharing method provided in this disclosure, the second user can also view the Detail page. The Detail page can be accessed through the method shown in S1903 of the embodiment shown in FIG. 19, and can be updated based on operations of the first or second user. As shown in FIGS. 23A-23C, FIG. 23A is a schematic diagram of a Detail page provided with a Refuse button and an Accept button and displayed when waiting for the second user to accept the request. The second user can select the Accept button to indicate that the second user agrees to accept the request. After the second user selects the Accept button to accept the request, the Detail page is updated as shown in FIG. 23B. FIG. 23B is a schematic diagram of a Detail page with a Video recording button that is displayed when the second user has accepted the request and when the first user is waiting for the second user to record a customized video. The second user can select the Video recording button to enter a Video shooting page. After the second user has completed video shooting, the Detail page is updated as shown in FIG. 23C, in which a Check Payment button and a View Comment button are displayed. The second user can click the Check Payment button to check the first user's payment, and click the View Comment button to view the first user's comments.

Optionally, an expiration time can be set for each stage of the transaction. If the second user takes no action before the time expires, the transaction is automatically canceled. For example, if the request is not accepted by the second user within a first expiration time (such as 48 hours), a transaction state change is triggered and the transaction state is changed to "transaction canceled", with a reason for the cancellation displayed, such as "The request is not accepted by the second user within the first expiration time", for example. If a customized video is not sent by the second user within a second expiration time (such as 168 hours), a transaction state change is triggered and the transaction state is changed to "transaction canceled" with a reason for the cancellation displayed, such as "The second user fails to send the customized video within the second expiration time", for example. The second user is also allowed to reject the request, which may trigger a change in transaction state, i.e., a change to "transaction canceled" with a reason displayed, such as "the request is rejected by the second user". The second user is also allowed to cancel the transaction after accepting the request, which may trigger a change in transaction state, i.e., a change to "transaction canceled" with a reason displayed, such as "the transaction is canceled by the second user". the first user can also actively cancel the transaction before the second user sends a customized video. For example, the first user may click the cancellation item on the Detail page displayed on the first client. After the transaction is canceled, the transaction state is changed to "transaction canceled" with a reason displayed, such as "The transaction is canceled by the first user".

The Detail page also comprises transaction progress information 2301 and video customization information 2302, wherein the transaction progress information comprises at least one of a transaction progress bar or a transaction progress time list. For example, as shown in FIG. 23C, the transaction progress bar and the transaction progress time list comprise a transaction progress bar 2301 comprising a progress node. for example, the transaction progress bar 2301 comprises three progress nodes, namely "request accepted", "in progress", and "complete". The progress time list 2303 comprises, for example, request time: 2020 Jan. 8, 15:35; time when the second user performs confirmation: Jan. 8, 2020, 15:36; time when the video is sent: Jan. 9, 2020 at 18:36.

When the transaction state changes, a new prompt massage appears in the dialogue box between the second user and the first user.

In this embodiment, by receiving a Transaction detail inquiry instruction input by the second user, a Detail page is displayed to enable the second user to timely know the transaction details, thereby improving the user experience.

In the above embodiment, after receiving a Video recording instruction, a Video recording window is displayed as shown in FIGS. 24A and 24B. In FIG. 24A, the second user selects the Shoot button 2401 to take a video. After the shooting is completed, the FIG. 24B is displayed, the second user selects the Send button 2402 to send the video to the first client. The second user can use built-in camera functions provided by the application, such as filters and beautification, before and after shooting the video.

Figure 25:
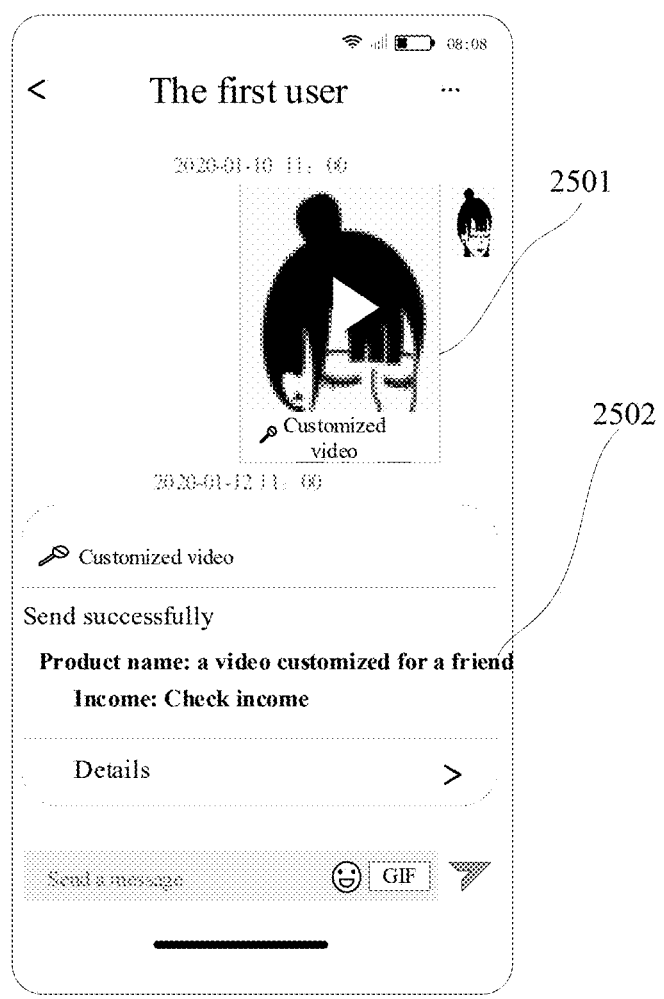
FIG. 25 is a schematic diagram of a dialog box provided in the present disclosure.

FIG. 25 shows a dialog box between the second client and the first client after the video has been sent to the first client. As shown in FIG. 25, the customized video 2501 delivered and a prompt message 2502 are displayed. The second user may select the customized video for playback.

Figure 26:
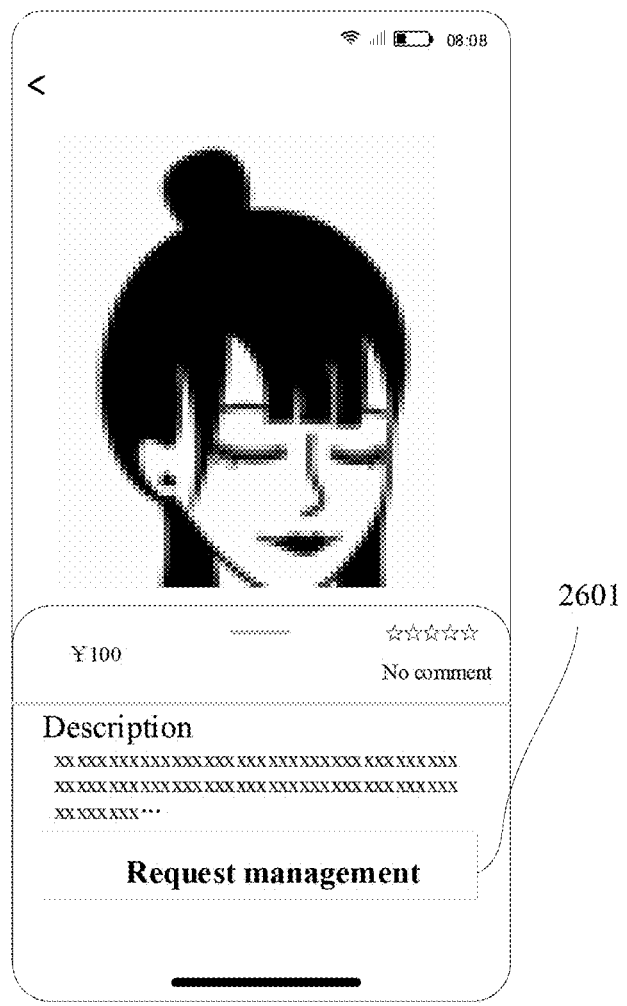
FIG. 26 is a schematic diagram of a second introduction page provided in the present disclosure.

On the basis of the embodiment shown in FIG. 19, in order to improve interface friendliness, a transition page is comprised between the Personal detail page of the second user and the Request List page, such as a second Introduction page as shown in FIG. 26. The second Introduction page comprises an Introduction Video page and a second Description page. The second introduction page of the second client differs from the first introduction page displayed by the first client in that the first description page of the first client displays the video customization information filling button, and the second description page of the second client displays the request management button 2601, and the second user accesses the request list page after selecting the request management button, and the rest of the two pages is similar and will not be repeated here.

In the above embodiment, the Request List page shown in FIG. 20 may also comprise an introduction area, in which an Edit button 2002 is displayed, and optionally, an income display area 2003.

Figures 27A, 27B:
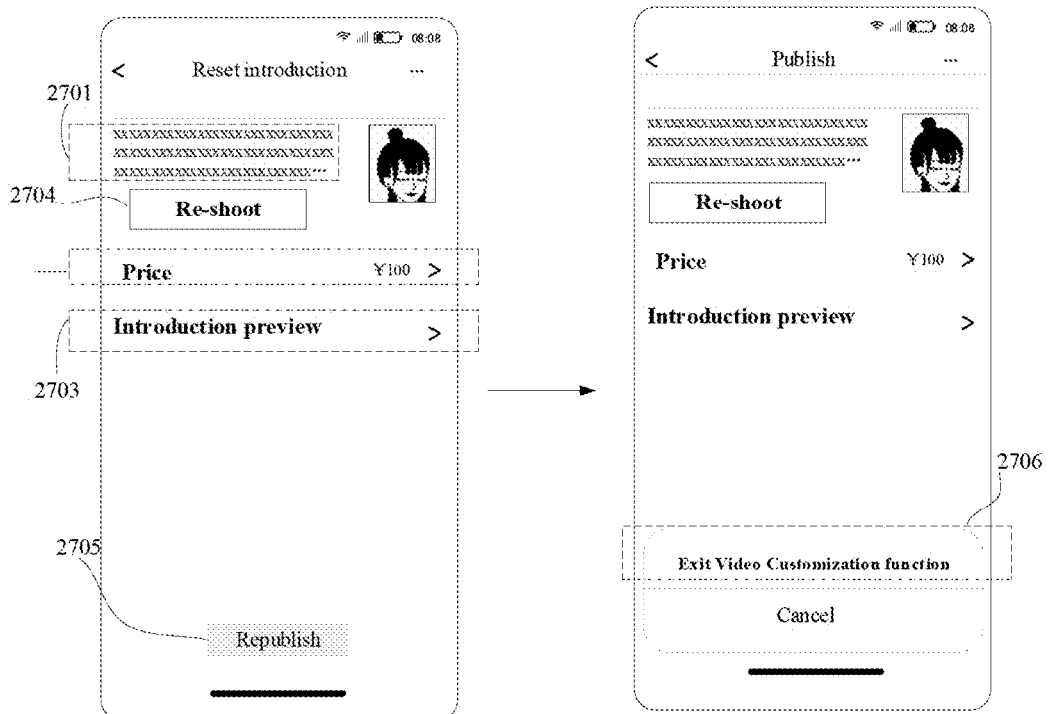
FIGS. 27A to 27D are schematic diagrams of an introduction reset page provided in the present disclosure.

The second user can select the Edit button to edit the content in the introduction area. The second client receives a selection instruction from the second user to select the Edit button and display an Introduction Reset page. As shown in FIG. 27A, the Introduction Reset page comprises at least one of a Description edition area 2701, a Transaction setting item 2702, an introduction preview guide item 2703, or a Video recording button 2704. The second user may enter a description in the Description edition area, such as a description about the video customization function. The second user can set a price in the Transaction setting item, and a specific amount can be set by inputting or selecting from a drop-down list. The unit of the amount can also be set by inputting or selecting from the drop-down list. The second user can enter a recording Introduction video interface by selecting the re-recording button. The second user can preview the introduction area through the Introduction preview guide item. The Introduction Reset page is also provided with a Re-publish button 2705. The second user can publish by selecting the Re-publish button. After republishing, the introduction area in the Request List page, as well as the relevant information on the first and second Description pages, will be updated synchronously.

Figures 27C, 27D:
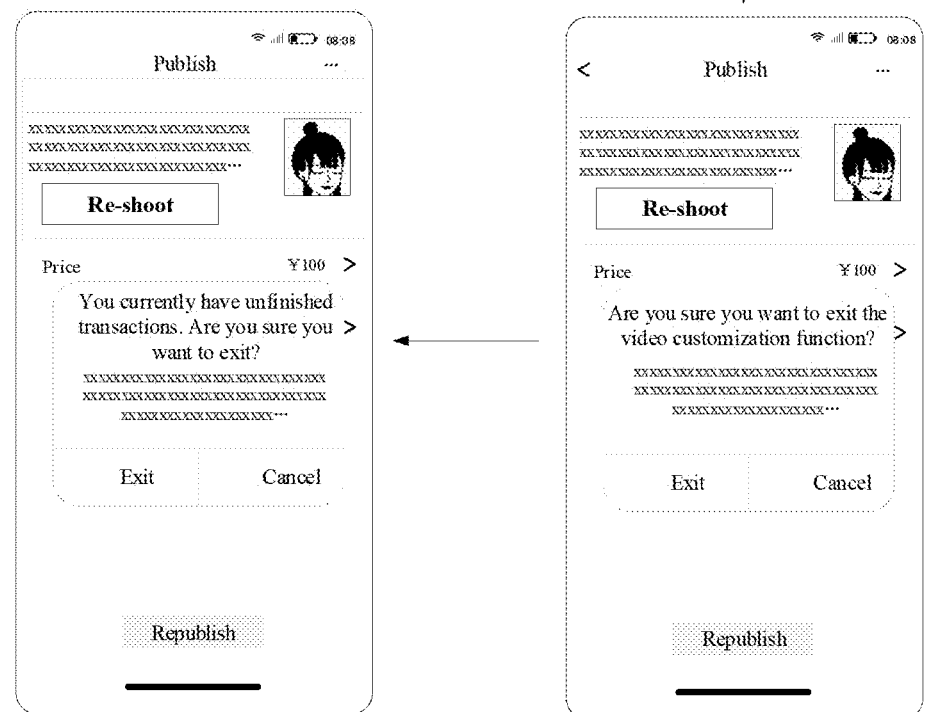

Optionally, in the Introduction Reset page, the user can also enter a recall instruction, which is used to overlay an Exit Video Customization button 2706 in the Introduction Reset page, as shown in FIG. 27B. The recall instruction can be input by sliding up from the bottom of the Introduction Reset page. The second user can select the Exit Video Customization button to exit the video customization function. When the second user selects the Exit Video Customization button, a state update message of a filling page of the video customization information is sent to the first client to update the filling page of video customization information of the first client to an invalid state. When the filling page of video customization information of the first client is updated to the invalid state, the input items of the filling page of video customization information cannot be edited. If there is a first introduction page, the video customization information filling button displayed in the first description page of the first introduction page will become invalid. In this case, the first user cannot enter the filling page of video customization information by clicking the video customization information filling button. Optionally, before sending a state update message of a filling page of the video customization information to the first client, the method may further comprise: displaying a Confirm to Exit Video Customization Function dialog box, which comprises: a Confirm button and a Cancel button. The Confirm to Exit Video Customization Function dialog box is used by the second user to confirm whether to exit the video customization function, as shown in FIG. 27C. Optionally, if the second user still has unfinished transactions, an Unfinished Transaction Confirmation dialog box can be further popped up, which is used to prompt the second user that there are still unfinished transactions. The Unfinished Transaction Confirmation dialog box comprises a Confirm button and a Cancel button, as shown in FIG. 27D. A selection operation on the Confirm button can be received from the second user to complete the exit of the video customization function.

Optionally, the Request List page shown in FIG. 20 may further comprise: a receiving Selection switch 2004. The second user may choose the state of the receiving Selection switch. For example, the switch can be slid to the right to enable request reception or to the left to disable request reception. The receiving Selection switch may take other forms, as long as it can be used by the second user to choose whether to receive requests, which is not specifically limited in the present disclosure. The second client receives, from the second user, a selection instruction on the receiving Selection switch, and sends a state update message of a filling page of the video customization information to the first client. The state comprises: reception enabled or reception disabled. Optionally, before sending a state update message of a filling page of the video customization information to the first client, the method may further comprise: popping up a Disable Request Reception Confirmation dialog box. As shown in FIG. 28A, the Disable Request Reception Confirmation dialog box comprises: a Confirm to Disable Request Reception button. Responding to a selection operation on the Confirm to Disable Request Reception button is received from the second user, the Disable Request Reception Confirmation dialog box is hidden, and the state of the receiving Selection switch is updated, as shown in FIG. 28B. By means of the receiving Selection switch, the second user can flexibly choose to enable or disable request reception according to his/her needs, thereby improving the user experience.

FIG. 29 is a schematic structure diagram of a video sharing apparatus provided in the present disclosure. The apparatus is applicable to a first client, wherein the first client is used by a first user to acquire non-customized video and customized video shared by a second user, the apparatus comprising: a receiving module 2901, a sending module 2902, and a display module 2903.

The receiving module 2901 is used for receiving a selection instruction from a first user to select a video customization anchor displayed on a first page, and the display module is used for displaying video customization related page, wherein the first page displays non-customized video shared by the second user, and the video customization related page comprise a filling page of video customization information.

The receiving module 2901 is further used for receiving video customization information input by the first user on the filling page of video customization information.

The receiving module 2901 is further used for receiving a submission instruction of the video customization information entered by the first user; and the sending module 2902 is used for sending a video customization request message to a second client, wherein the video customization request message comprises the video customization information;

The receiving module 2901 is further used for receiving a video customization response message sent from the second client, and the display module 2903 is further used for displaying a customized video corresponding to the video customization information, wherein the video customization response message comprises the customized video.

Optionally, the receiving module 2901 is particularly used for receiving a selection instruction from the first user to select a video customization anchor displayed in a Personal detail page of the second user; or receiving a selection instruction from the first user to select a video customization anchor displayed on a video playing page of non-customized video of the second user.

Optionally, the receiving module 2901 is particularly used for receiving a selection instruction from the first user to select a single anchor displayed on the video playing page of the non-customized video of the second user, wherein the single anchor is the video customization anchor; or receiving a selection instruction from the first user to select a combined anchor displayed on the video playing page of the non-customized video of the second user, displaying an Anchor presentation page corresponding to the combined anchor, and receiving a selection instruction from the first user to select a video customization anchor on the Anchor presentation page, wherein the Anchor presentation page comprises the video customization anchor.

Optionally, the video customization anchor is a link or a button.

Optionally, the video customization related page further comprise: a first introduction page comprising an Introduction Video page for displaying an introduction video and a Description page for displaying a video customization information filling button; the receiving module 2901 is further used to perform at least of receiving a selection instruction from the first user to select the video customization information filling button, and displaying the filling page of video customization information; or receiving a selection instruction from the first user to select the Introduction Video page, and playing the introduction video.

Optionally, the display module 2903 is further used for displaying a transaction page to receive a transaction instruction entered by the first user; the receiving module 2901 is further used for acquiring a transaction result of the first user, and determining that the transaction result of the first user indicates a successful payment.

Optionally, the receiving module 2901 is further used to perform at least of receiving a playing instruction entered by the first user to play the customized video, and playing the customized video; or receiving a download instruction entered by the first user to download the customized video, and downloading the customized video; or receiving a forward instruction entered by the first user to forward the customized video, and forwarding the customized video.

Optionally, the receiving module 2901 is further used for receiving a Transaction detail inquiry instruction entered by the first user, and the display module 2903 is further used for displaying a Detail page, which comprises transaction progress information comprising at least one of a transaction progress bar or a transaction progress time list.

Optionally, the receiving module 2901 is particularly used for receiving a selection instruction from the first user to select a message item of the second user, and the control module is particularly used for displaying a prompt message comprising a Detail guide item; the receiving module 2901 is particularly used for receiving a selection instruction from the first user to select the Detail guide item.

Optionally, the display module 2903 is further used for displaying a Comment page comprising a Comment item and a Post Comment button; the receiving module 2901 is further used for receiving information entered by the first user for the comment item; receiving a selection instruction from the first user to select the Post Comment button, and the display module 2903 is further used for displaying a Comment Result page for displaying comment state.

The apparatus provided in this embodiment can be used to perform the steps carried out on the first client in the above method embodiment, and its principle and technical effect are similar to that of the method embodiment, which will not be repeated here.

Figure 30:
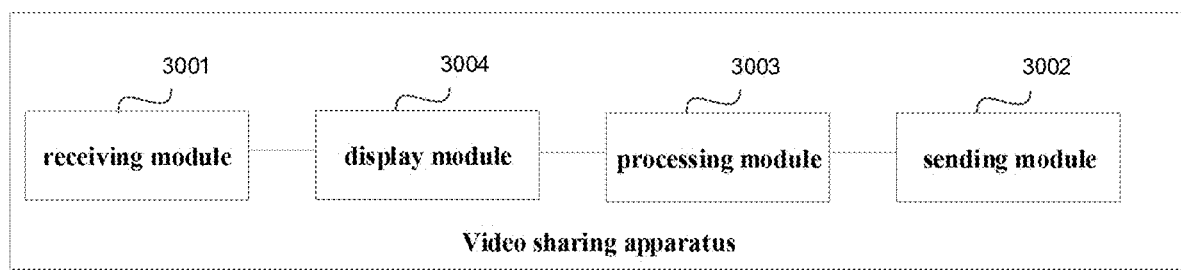
FIG. 30 is a schematic diagram of the structure of another video sharing apparatus provided in the present disclosure.

FIG. 30 is a schematic structure diagram of another video sharing apparatus provided in the present disclosure. This apparatus is applicable to a second client, wherein the second client is used by a second user to share non-customized video and customized video, the apparatus comprising: a receiving module 3001, a sending module 3002, a processing module 3003, and a display module 3004.

The receiving module 3001 is used for receiving a video customization request message sent by a first client, wherein the video customization request message comprises video customization information; and generating a detail page based on the video customization request message; the receiving module 3001 is further used for receiving a Detail checking instruction entered by the second user, and the display module 3004 is used for displaying the Detail page that displays the video customization information; the receiving module 3001 is further used for receiving a Video recording instruction entered by the second user on the Detail page, and the display module 3004 is further used for displaying a Video recording window; the processing module 3003 is used for generating a customized video based on a record operation input by the second user in the Video recording window;

the sending module 3002 is used for sending a video customization response message to the first client, which comprises the customized video.

Optionally, the receiving module 3001 is particularly used for receiving a selection instruction from the second user to select a Detail guide button displayed on a Request List page; or receiving a selection instruction from the second user to select a Detail guide button displayed on a prompt message within a dialog box with the first user.

Optionally, the receiving module 3001 is further used for receiving a selection instruction from the second user to select a video customization anchor displayed in a Personal detail page of the second user, and the display module 3004 is further used for displaying the Request List page; or the receiving module 3001 is further used for receiving a selection instruction from the second user to select a video customization anchor displayed on a User Account page, and the display module 3004 is further used for displaying the Request List page; or the receiving module 3001 is further used for receiving a selection instruction from the second user to select a video customization anchor displayed on a Video playing page of non-customized video of the second user, and the display module 3004 is further used for displaying the Request List page.

Optionally, the Request List page further comprises: a Selection switch; the receiving module 3001 is further used for receiving a selection instruction from the second user to select the Selection switch, and sending a state update message of a filling page of the video customization information to the first client to update a state of the filling page of video customization information of the first client to valid or invalid.

Optionally, the Request List page further comprises: an introduction area in which an Edit button is displayed; the receiving module 3001 is further used for receiving a selection instruction from the second user to select the Edit button, and the display module 3004 is further used for displaying an Introduction Reset page, which comprises at least one of a Description edition area, a Transaction setting item, an introduction preview guide item, and a Video recording button.

Optionally, the receiving module 3001 is further used for receiving a recall instruction entered by the second user on the Introduction Reset page, which is used to overlay the display of an Exit Video Customization button on the Introduction Reset page;

The receiving module 3001 is further used for receiving a selection instruction from the second user to select the Exit Video Customization button, and sending a state update message of a filling page of the video customization information to the first client to update a state of the filling page of video customization information of the first client to invalid.

Optionally, the receiving module 3001 is further used for receiving a selection instruction from the second user to select a video customization anchor in a user account page for a first time, and the display module 3004 is further used for displaying a Video Customization Function page, which comprises a Create Introduction Page button; the receiving module 3001 is further used for receiving a selection instruction from the second user to select the Create Introduction Page button, and the display module 3004 is further used for displaying a Video recording window; the processing module 3003 is used for generating an introduction video based on a video recording operation of the second user; the display module 3004 is further used for displaying an Introduction Setting page, which comprises at least one of a Description edition area, a Transaction setting item, and an introduction preview guide item; the receiving module 3001 is further used for receiving an input instruction from the second user to select at least one of the Description edition area, the Transaction setting item, and the Introduction preview guide item; the receiving module 3001 is further used for receiving a selection instruction from the second user to select a Publish button displayed on the Introduction Setting page, and the display module 3004 is further used for displaying a publishing result.

The apparatus provided in this embodiment can be used to perform the steps carried out on the second client in the above method embodiment, and its principle and technical effect are similar to that of the method embodiment, which will not be repeated here.

The present disclosure further provides an electronic device, comprising: a processor for executing a computer program stored in memory, wherein the computer program, when executed by the processor, implements the steps carried out on the first client in the above method embodiment.

The present disclosure further provides a non-transitory computer-readable medium having stored thereon a computer program that, when executed by a processor, implements the steps carried out on the first client in the above method embodiment.

The present disclosure provides a computer program product that, when running on a computer, causes the computer to implement the steps carried out on the first client in the above method embodiment.

The present disclosure further provides an electronic device, comprising: a processor for executing a computer program stored in memory, wherein the computer program, when executed by the processor, implements the steps carried out on the second client in the above method embodiment.

The present disclosure further provides a non-transitory computer-readable medium having stored thereon a computer program that, when executed by a processor, implements the steps carried out on the second client in the above method embodiment.

The present disclosure provides a computer program product that, when running on a computer, causes the computer to implement the steps carried out on the second client in the above method embodiment.

The present disclosure provides a computer program, comprising: instructions that, when executed by a processor, cause the processor to execute the video acquisition method of any one of the above embodiments.

The present disclosure provides a computer program, comprising: instructions that, when executed by a processor, cause the processor to execute the video sharing method of any one of the above embodiments.

The present disclosure provides a computer program product comprising instructions that, when executed by a processor, cause the processor to execute the video acquisition method of any one of the above embodiments.

The present disclosure provides a computer program product comprising instructions that, when executed by a processor, cause the processor to execute the video sharing method of any one of the above embodiments.

Note that, in this description, the use of relational terms, if any, such as "first" and "second" and the like are used solely to distinguish one from another entity or action without necessarily requiring or implying any actual such relationship or order between such entities or actions. Further, terms "comprise", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A video acquisition method applied to a first client, wherein the first client is used by a first user to acquire a non-customized video and a customized video shared by a second user, the video acquisition method comprising:

receiving a selection instruction from the first user to select a video customization anchor displayed on a first page, and displaying a video customization related page, wherein the first page displays the non-customized video shared by the second user, and the video customization related page comprises a filling page of video customization information;

receiving the video customization information entered by the first user on the filling page of the video customization information;

receiving a submission instruction of the video customization information entered by the first user, and sending a video customization request message to a second client, wherein the video customization request message comprises the video customization information; and receiving a video customization response message sent from the second client, and displaying a customized video corresponding to the video customization information, wherein the video customization response message comprises the customized video, wherein the receiving a selection instruction from a first user to select a video customization anchor displayed on a first page comprises:

receiving the selection instruction from the first user to select a combined anchor displayed on the video playing page of the non-customized video of the second user, displaying the anchor presentation page corresponding to the combined anchor, and receiving the selection instruction from the first user to select the video customization anchor on the anchor presentation page, wherein the anchor presentation page comprises the video customization anchor, and the anchor presentation page displays a plurality of anchors corresponding to a plurality of functions pointed to by the combined anchor.

2. The video acquisition method according to claim 1, wherein the receiving a selection instruction from a first user to select a video customization anchor displayed on a first page comprises:

receiving the selection instruction from the first user to select the video customization anchor displayed in a Personal detail page of the second user; or receiving the selection instruction from the first user to select the video customization anchor displayed on a video playing page of the non-customized video of the second user.

3. The video acquisition method according to claim 1, wherein:

the video customization anchor comprises a link or a button; or the customized video is recorded by the second user on a second client, the second client and the first client being clients of the same application.

4. The video acquisition method according to claim 1, wherein the video customization related page further comprise a first introduction page comprising an introduction video page for displaying an introduction video and a description page for displaying a video customization information filling button;

before the receiving the video customization information entered by the first user on the filling page of the video customization information, the video acquisition method further comprises at least one of:

receiving a selection instruction from the first user to select the video customization information filling button, and displaying the filling page of the video customization information; or receiving a selection instruction from the first user to select the introduction video page, and playing the introduction video.

5. The video acquisition method according to claim 1, before the receiving a video customization response message sent from the second client, the video acquisition method further comprising:

displaying a transaction page to receive a transaction instruction entered by the first user; and acquiring a transaction result of the first user, and determining that the transaction result of the first user indicates a successful payment.

6. The video acquisition method according to claim 1, after the displaying a customized video corresponding to the video customization information, the video acquisition method further comprising at least one of:

receiving a playing instruction entered by the first user to play the customized video, and playing the customized video;

receiving a download instruction entered by the first user to download the customized video, and downloading the customized video;

receiving a forward instruction entered by the first user to forward the customized video, and forwarding the customized video; or displaying a comment page comprising a comment item and a post comment button, receiving information entered by the first user for the comment item, receiving a selection instruction from the first user to select the post comment button, and displaying a comment result page for displaying comment state.

7. The video acquisition method according to claim 1, after the sending a video customization request message to a second client, the video acquisition method further comprising:

receiving a transaction detail inquiry instruction entered by the first user, and displaying a detail page, which comprises transaction progress information comprising at least one of a transaction progress bar or a transaction progress time list.

8. The video acquisition method according to claim 7, wherein the receiving a transaction detail inquiry instruction entered by the first user comprises:

receiving a selection instruction from the first user to select a message item of the second user, and displaying a prompt message comprising a detail guide item; and receiving a selection instruction from the first user to select the detail guide item.

9. An electronic device, comprising: a processor for executing a computer program stored in memory, wherein the computer program, when executed by the processor, implements steps of the video acquisition method according to claim 1.

10. A non-transitory computer-readable storage medium having stored thereon a computer program that, when executed by a processor, implements the steps of the video acquisition method according to claim 1.

* * * * *